US012521297B1

(12) United States Patent
Fox et al.

(10) Patent No.: US 12,521,297 B1
(45) Date of Patent: Jan. 13, 2026

(54) ENHANCED TRANSPARENCY EXOSKELETON

(71) Applicant: APPTRONIK, INC., Austin, TX (US)

(72) Inventors: Jonas Alexan Fox, Austin, TX (US); Nicholas Arden Paine, Austin, TX (US); Paul Gloninger Fleury, Austin, TX (US); Bradley Aaron Resh, Austin, TX (US)

(73) Assignee: Apptronik, Inc., Austin, TX (US)

( * ) Notice: Subject to any disclaimer, the term of this patent is extended or adjusted under 35 U.S.C. 154(b) by 1026 days.

(21) Appl. No.: 17/498,635

(22) Filed: Oct. 11, 2021

Related U.S. Application Data

(60) Provisional application No. 63/090,042, filed on Oct. 9, 2020.

(51) Int. Cl.
*A61H 3/00* (2006.01)

(52) U.S. Cl.
CPC ......... *A61H 3/00* (2013.01); *A61H 2003/007* (2013.01); *A61H 2201/1207* (2013.01); *A61H 2201/165* (2013.01); *A61H 2205/088* (2013.01); *A61H 2205/10* (2013.01)

(58) Field of Classification Search
CPC ................ A61H 3/00; A61H 2003/007; A61H 2201/1207; A61H 2201/165; A61H 2205/088; A61H 2205/10
See application file for complete search history.

(56) References Cited

U.S. PATENT DOCUMENTS

| | | | |
|---|---|---|---|
| 5,904,721 | A | 5/1999 | Henry et al. |
| 8,870,967 | B2 | 10/2014 | Herr et al. |
| 9,080,918 | B2 | 7/2015 | Fishel et al. |
| 11,035,743 | B2 | 6/2021 | Paine et al. |
| 11,312,012 | B2 | 4/2022 | Kaehler |
| 11,461,867 | B2 | 10/2022 | Gildert et al. |
| 11,478,927 | B1 | 10/2022 | Kranski et al. |
| 11,625,122 | B2 | 4/2023 | Kranski et al. |
| 11,636,398 | B2 | 4/2023 | Kranski et al. |
| 11,639,004 | B2 | 5/2023 | Khadivinassab et al. |
| 11,691,270 | B2 | 7/2023 | Shannon |
| 11,691,274 | B2 | 7/2023 | Kaehler |
| 11,691,278 | B2 | 7/2023 | Kranski et al. |
| 11,717,963 | B2 | 8/2023 | Gildert et al. |
| 11,717,974 | B1 | 8/2023 | Gildert et al. |

(Continued)

FOREIGN PATENT DOCUMENTS

| | | |
|---|---|---|
| WO | WO 2015099858 | 7/2015 |
| WO | WO 2019076417 | 4/2019 |

(Continued)

OTHER PUBLICATIONS

Ansari et al., "A Survey of Current Exoskeletons and Their Control Architectures and Algorithms (Draft 4.0)," Carnegie Mellon University, Oct. 1, 2015, 42 pages.

(Continued)

*Primary Examiner* — Jerrah Edwards
*Assistant Examiner* — Jose H. Trevino, III
(74) *Attorney, Agent, or Firm* — Fish & Richardson P.C.

(57) ABSTRACT

An increased transparency exoskeleton is provided that includes a hip joint assembly. The exoskeleton includes a hip joint assembly connecting a leg assembly to a torso portion. The hip joint assembly has a hip abduction/adduction to hip internal/external rotation to hip flexion/extension kinematic chain.

26 Claims, 31 Drawing Sheets

(56) References Cited

U.S. PATENT DOCUMENTS

| | | | | |
|---|---|---|---|---|
| 11,787,049 | B2 | 10/2023 | Gildert et al. | |
| 11,787,050 | B1 | 10/2023 | Kaehler et al. | |
| 11,812,126 | B2 | 11/2023 | Hill et al. | |
| 11,848,014 | B2 | 12/2023 | Peck | |
| 11,865,703 | B2 | 1/2024 | Shannon et al. | |
| 11,867,574 | B1 | 1/2024 | Fishel et al. | |
| 11,913,562 | B2 | 2/2024 | Sterling et al. | |
| 11,931,894 | B1 | 3/2024 | Rose et al. | |
| 11,938,634 | B2 | 3/2024 | Gildert et al. | |
| 11,999,063 | B1 | 6/2024 | Rose et al. | |
| 12,011,867 | B2 | 6/2024 | Sterling et al. | |
| 12,030,196 | B2 | 7/2024 | Gildert | |
| 12,036,669 | B2 | 7/2024 | Paine et al. | |
| 12,066,347 | B2 | 8/2024 | Wu et al. | |
| 12,099,343 | B2 | 9/2024 | Kaehler | |
| 12,122,040 | B2 | 10/2024 | Gildert et al. | |
| 12,124,651 | B2 | 10/2024 | Kranski et al. | |
| 12,129,944 | B2 | 10/2024 | Sterling et al. | |
| 12,138,809 | B2 | 11/2024 | Rose | |
| 12,145,266 | B2 | 11/2024 | Rose et al. | |
| 12,157,226 | B2 | 12/2024 | Kranski et al. | |
| 12,162,138 | B2 | 12/2024 | Shannon | |
| 12,162,153 | B2 | 12/2024 | Rose et al. | |
| 12,172,297 | B2 | 12/2024 | Khadivinassab et al. | |
| 12,172,307 | B2 | 12/2024 | Shannon et al. | |
| 12,172,317 | B2 | 12/2024 | Kaehler et al. | |
| 12,172,327 | B2 | 12/2024 | Gildert | |
| 2011/0040216 | A1 | 2/2011 | Herr et al. | |
| 2012/0283845 | A1 | 11/2012 | Herr et al. | |
| 2013/0310979 | A1 | 11/2013 | Herr et al. | |
| 2015/0209214 | A1 | 7/2015 | Herr et al. | |
| 2016/0113831 | A1 | 4/2016 | Hollander | |
| 2016/0250094 | A1 | 9/2016 | Amundson et al. | |
| 2017/0209330 | A1* | 7/2017 | Hughes | A61H 1/0266 |
| 2017/0341227 | A1 | 11/2017 | Sentis et al. | |
| 2018/0065243 | A1 | 3/2018 | Kim et al. | |
| 2018/0116828 | A1 | 5/2018 | Quinn et al. | |
| 2020/0238542 | A1* | 7/2020 | Castro | A61H 1/0281 |
| 2021/0053208 | A1 | 2/2021 | Paine et al. | |
| 2021/0122035 | A1 | 4/2021 | Furlan | |
| 2021/0298922 | A1 | 9/2021 | Sun et al. | |
| 2021/0307170 | A1 | 9/2021 | Wu et al. | |
| 2022/0101477 | A1 | 3/2022 | Gildert et al. | |
| 2022/0105643 | A1 | 4/2022 | Shannon | |
| 2022/0105644 | A1 | 4/2022 | Shannon | |
| 2022/0287904 | A1* | 9/2022 | Gloger | A61H 3/008 |
| 2022/0314435 | A1 | 10/2022 | Wales et al. | |
| 2022/0314448 | A1 | 10/2022 | Wales et al. | |
| 2022/0324113 | A1 | 10/2022 | Rose | |
| 2022/0324114 | A1 | 10/2022 | Rose | |
| 2022/0355485 | A1 | 11/2022 | Rose | |
| 2022/0355486 | A1 | 11/2022 | Rose | |
| 2022/0355487 | A1 | 11/2022 | Rose | |
| 2022/0371183 | A1 | 11/2022 | Shannon et al. | |
| 2022/0390045 | A1 | 12/2022 | Sterling et al. | |
| 2022/0401284 | A1* | 12/2022 | Arzanpour | A61H 1/024 |
| 2022/0402126 | A1 | 12/2022 | Gildert | |
| 2022/0404835 | A1 | 12/2022 | Gildert | |
| 2023/0023985 | A1 | 1/2023 | Shannon | |
| 2023/0053753 | A1 | 2/2023 | Gildert et al. | |
| 2023/0054297 | A1 | 2/2023 | Gildert et al. | |
| 2023/0056745 | A1 | 2/2023 | Gildert et al. | |
| 2023/0078625 | A1 | 3/2023 | Kaehler et al. | |
| 2023/0083349 | A1 | 3/2023 | Kranski et al. | |
| 2023/0085731 | A1 | 3/2023 | Shannon et al. | |
| 2023/0111067 | A1 | 4/2023 | Gildert et al. | |
| 2023/0111284 | A1 | 4/2023 | Gildert et al. | |
| 2023/0114376 | A1 | 4/2023 | Gildert et al. | |
| 2023/0122611 | A1 | 4/2023 | Rose | |
| 2023/0148120 | A1 | 5/2023 | Kranski et al. | |
| 2023/0150135 | A1 | 5/2023 | Shannon | |
| 2023/0202028 | A1 | 6/2023 | Gildert et al. | |
| 2023/0202029 | A1 | 6/2023 | Shannon | |
| 2023/0202038 | A1 | 6/2023 | Gildert et al. | |
| 2023/0205291 | A1 | 6/2023 | Shannon | |
| 2023/0205292 | A1 | 6/2023 | Shannon | |
| 2023/0211507 | A1 | 7/2023 | Shannon | |
| 2023/0237378 | A1 | 7/2023 | Kranski et al. | |
| 2023/0278201 | A1 | 9/2023 | Gildert | |
| 2023/0278202 | A1 | 9/2023 | Gildert | |
| 2023/0278223 | A1 | 9/2023 | Gildert | |
| 2023/0297186 | A1 | 9/2023 | O'Rourke | |
| 2023/0302659 | A1 | 9/2023 | Lee et al. | |
| 2023/0302660 | A1 | 9/2023 | Lee et al. | |
| 2023/0302661 | A1 | 9/2023 | Martin | |
| 2023/0311316 | A1 | 10/2023 | Gildert et al. | |
| 2023/0333593 | A1 | 10/2023 | Meier | |
| 2023/0339104 | A1 | 10/2023 | Kaehler | |
| 2023/0364806 | A1 | 11/2023 | Lee et al. | |
| 2023/0364807 | A1 | 11/2023 | Lee et al. | |
| 2023/0364808 | A1 | 11/2023 | Lee et al. | |
| 2023/0381957 | A1 | 11/2023 | Gildert et al. | |
| 2023/0381958 | A1 | 11/2023 | Gildert et al. | |
| 2024/0033921 | A1 | 2/2024 | Moore et al. | |
| 2024/0033922 | A1 | 2/2024 | Moore et al. | |
| 2024/0037848 | A1 | 2/2024 | Moore et al. | |
| 2024/0046572 | A1 | 2/2024 | Moore et al. | |
| 2024/0046573 | A1 | 2/2024 | Moore et al. | |
| 2024/0096003 | A1 | 3/2024 | Gildert et al. | |
| 2024/0096004 | A1 | 3/2024 | Gildert et al. | |
| 2024/0096005 | A1 | 3/2024 | Gildert et al. | |
| 2024/0109612 | A1 | 4/2024 | Gildert | |
| 2024/0175516 | A1 | 5/2024 | Forughi et al. | |
| 2024/0181647 | A1 | 6/2024 | Gildert et al. | |
| 2024/0208082 | A1 | 6/2024 | Shannon et al. | |
| 2024/0217096 | A1 | 7/2024 | Maleki et al. | |
| 2024/0246231 | A1 | 7/2024 | Gildert et al. | |
| 2024/0253211 | A1 | 8/2024 | Rose et al. | |
| 2024/0253212 | A1 | 8/2024 | Rose et al. | |
| 2024/0253220 | A1 | 8/2024 | Wells et al. | |
| 2024/0253221 | A1 | 8/2024 | Gidert | |
| 2024/0253222 | A1 | 8/2024 | Gidert | |
| 2024/0253239 | A1 | 8/2024 | Gidert | |
| 2024/0253243 | A1 | 8/2024 | Gidert | |
| 2024/0256794 | A1 | 8/2024 | Gidert | |
| 2024/0278435 | A1 | 8/2024 | Gildert | |
| 2024/0280967 | A1 | 8/2024 | Wells et al. | |
| 2024/0286280 | A1 | 8/2024 | Karimi Eskandary et al. | |
| 2024/0294219 | A1 | 9/2024 | Gildert et al. | |
| 2024/0294220 | A1 | 9/2024 | Gildert et al. | |
| 2024/0300115 | A1 | 9/2024 | Rose et al. | |
| 2024/0316759 | A1 | 9/2024 | Maleki et al. | |
| 2024/0316761 | A1 | 9/2024 | Rose et al. | |
| 2024/0316795 | A1 | 9/2024 | Hill et al. | |
| 2024/0316796 | A1 | 9/2024 | Maleki et al. | |
| 2024/0351211 | A1 | 10/2024 | Shannon et al. | |
| 2024/0351212 | A1 | 10/2024 | Shannon et al. | |
| 2024/0359319 | A1 | 10/2024 | Rose et al. | |
| 2024/0359331 | A1 | 10/2024 | Gildert | |
| 2024/0367316 | A1 | 11/2024 | Gildert et al. | |
| 2024/0367317 | A1 | 11/2024 | Gildert et al. | |
| 2024/0375299 | A1 | 11/2024 | Shannon et al. | |
| 2024/0393190 | A1 | 11/2024 | Fishel et al. | |
| 2025/0001611 | A1 | 1/2025 | Gildert | |
| 2025/0001612 | A1 | 1/2025 | Gildert | |
| 2025/0001613 | A1 | 1/2025 | Gildert | |
| 2025/0050495 | A1 | 2/2025 | Gildert et al. | |
| 2025/0050496 | A1 | 2/2025 | Gildert et al. | |
| 2025/0050497 | A1 | 2/2025 | Gildert et al. | |

FOREIGN PATENT DOCUMENTS

| | | | |
|---|---|---|---|
| WO | WO 2022174344 | A1 | 8/2022 |
| WO | WO 2022217346 | A1 | 10/2022 |
| WO | WO 2022232934 | A1 | 11/2022 |
| WO | WO 2022241570 | A1 | 11/2022 |
| WO | WO 2023015383 | A1 | 2/2023 |
| WO | WO 2023082013 | A1 | 5/2023 |
| WO | WO 2023122834 | A1 | 7/2023 |
| WO | WO 2023164781 | A1 | 9/2023 |
| WO | WO 2023235977 | A1 | 12/2023 |
| WO | WO 2024065045 | A1 | 4/2024 |
| WO | WO 2024113059 | A1 | 6/2024 |
| WO | WO 2024119268 | A1 | 6/2024 |

(56) References Cited

FOREIGN PATENT DOCUMENTS

| | | |
|---|---|---|
| WO | WO 2024130449 A1 | 6/2024 |
| WO | WO 2024159308 A1 | 8/2024 |
| WO | WO 2024159310 A1 | 8/2024 |
| WO | WO 2024159311 A1 | 8/2024 |
| WO | WO 2024159312 A1 | 8/2024 |
| WO | WO 2024168420 A3 | 8/2024 |
| WO | WO 2024182899 A1 | 9/2024 |
| WO | WO 2024239110 A1 | 11/2024 |

OTHER PUBLICATIONS

Army-Technology.com [online], “Raytheon XOS 2 Exoskeleton, Second-Generation Robotics Suit,” May 29, 2020, retrieved on Sep. 8, 2022, retrieved from URL <https://www.army-technology.com/projects/raytheon-xos-2-exoskeleton-us/> 9 pages.

Chen et al., “Mechanical Design and Evaluation of a Compact Portable Knee-Foot Robot for Gait Rehabilitation,” Elsevier, Mechanism and Machine Theory 103 (2016) pp. 51-64.

Eksobionics.com [online], “EksoGT,” available on or before Jul. 13, 2017, via Internet Archive: Wayback Machine URL <http://web.archive.org/web/20170713095157/https://eksobionics.com/eksohealth/products/>, retrieved on Sep. 8, 2022, URL <https://eksobionics.com/eksohealth/products/>, 10 pages.

International Search Report and Written Opinion issued for International PCT Application No. PCT/US19/21413, mailed on May 29, 2019, 6 pages.

Kim, “Anthropomorphic Low-Inertia High-Stiffness Manipulator for High-Speed Safe Interaction,” IEEE Transactions on Robotics, Dec. 2017, 33(6):1358 -1374.

Paine et al., “Actuator Control for the NASA-JSC Valkyrie Humanoid Robot: A Decoupled Dynamics Approach for Torque Control of Series Elastic Robots,” Journal of Field Robotics, May 2015, 32(3):378-396.

Robots.ihmc.us [online], “NASA-IHMC X1 Mina Exoskeleton,” available on or before Jan. 25, 2018, via Internet Archive: Wayback Machine URL <http://web.archive.org/web/20180125004907/http://robots.ihmc.us/x1-mina-exoskeleton/>, retrieved on Sep. 8, 2022, URL <http://robots.ihmc.us/x1-mina-exoskeleton/>, 5 pages.

Robots.ihmc.us [online], “The Grasshopper Exercise Device,” available on or before Jul. 17, 2017, retrieved on Sep. 8, 2022, retrieved from URL <http://robots.ihmc.us/grasshopper/>, 7 pages.

Sarcos.com [online], “Guardian® XO® Full-Body Powered Exoskeleton,” available on or before Mar. 1, 2020, via Internet Archive: Wayback Machine URL <http://web.archive.org/web/20200301031510/https://www.sarcos.com/products/guardian-xo-powered-exoskeleton/>, retrieved on Sep. 8, 2022, URL <https://www.sarcos.com/products/guardian-xo-powered-exoskeleton/>, 9 pages.

* cited by examiner

400

ENHANCED TRANSPARENCY EXOSKELETON

RELATED APPLICATIONS

This application claims priority under 35 U.S.C. § 119(e) to U.S. Provisional Patent Application No. 63/090,042, entitled "Enhanced Transparency Exoskeleton," which hereby incorporated in its entirety by reference herein for all purposes.

GOVERNMENT LICENSE RIGHTS

This invention was made with government support under contract H9222-17-C-0074 awarded by U.S. Special Operations Command (USSOCOM). The government has certain rights in the invention.

BACKGROUND

Exoskeletons have long held promise as devices that could imbue humans with super-human strength or endurance or that could assist humans with physical disabilities better perform daily functions. In recent years, exoskeleton devices have been developed for prosthetic, orthotic and human strength assistive use. These exoskeletons have been used to amplify the strength of the wearer by applying assistive torques to the wearer's joints and support the weight of the wearer and/or a payload carried by the wearer.

Exoskeleton devices typically include a rigid framework having one or more articulated joints (e.g., a knee joint and ankle joint in a lower extremity exoskeleton device), and one or more actuators for controlling joint articulation. Current exoskeletons suffer limitations with respect to "transparency," where transparency is loosely defined as the awareness the human has that they are wearing an exoskeleton. A system with poor transparency noticeably encumbers the wearer, getting in the way of or unduly burdening the wearer's movement. A system with good transparency, on the other hand, does not significantly get in the way of or burden the wearer.

Poor transparency is often the result of kinematic misalignment and a limited range of motion. An exoskeleton that is kinematically misaligned with the wearer's kinematics or overly simplifies human kinematics exhibits unnatural motion and overly constrains the wearer's natural range of motion, leading to low transparency. Similarly, an exoskeleton with a more limited range of motion than the wearer, regardless of kinematic alignment, can noticeably constrain the wearer, again resulting in poor transparency.

The bulk and mass of the exoskeleton may also interfere with the human's range of motion. Bulk is an issue because the volume of the exoskeleton protruding from the wearer's natural volume may also inhibit range of motion. With respect to mass, the additional torque provided at the exoskeleton's joints may not be enough benefit to outweigh the additional weight of the system. This effect is compounded the farther away from the torso the additional mass is located. Mass at the feet and hands is most detrimental.

Transparency is also reduced due to a lack of coupling between the human wearer and the exoskeleton. Many exoskeletons physically connect to the human at the hands and feet and then follow anatomical kinematic chains along the rest of the limb. This approach can lead to significant relative motion between the human and the exoskeleton which adds a level of unnatural dynamics to motions the human would otherwise be comfortable performing. This is especially problematic for highly dynamic behaviors like walking and running.

Unnatural dynamics or a constrained range of motion often result from compromises made when designing the joints of the exoskeleton. In order to try to match the kinematics of the human hip and to avoid penetrating the human volumetric envelope, exoskeletons typically provide a structural path across the hip joint using a serial chain of rotational joints. The order of these joints plays an important role in the workspace of the exoskeleton's leg and in the structural efficiency of the material between the joints. Many exoskeletons either simplify the three degree-of-freedom ("DOF") of a spherical joint spherical joint to a 2-DOF approximation or resort to kinematic misalignment, which means the center of rotation of the hip joints of the exoskeleton do not align with the center of rotation of the wearer's hips. These simplifications result in an exoskeleton that has poor transparency and either hinders motion or applies undue forces/torques to the human as they move through their natural range of motion.

Some hip joint designs use a 3-DOF mechanism with limited workspace due to singularities (gimbal lock). FIG. 28 illustrates one embodiment of an exoskeleton with a 3-DOF hip which had good kinematic alignment. The kinematic chain of the hip joint is abduction/adduction→flexion/extension→nternal/external rotation. This kinematic chain works well in some poses but encounters problems when the flexion/extension joint moves (e.g., lifting the leg as though to take a step up onto stairs). At a 90-degree rotation of the flexion/extension joint, the hip internal/external rotation DOF becomes aligned with the abduction/adduction DOF, thus removing one degree of freedom. This condition is known as gimbal lock and has negative impacts on leg workspace. Many other exoskeleton designs share this kinematic chain.

Another joint that can result in poor transparency is the ankle joint. The human ankle has complex kinematics that make approximations with fixed external structures difficult. Most exoskeleton ankles approximate the human ankle as a 1- or 2- DOF mechanism. The 2-DOF mechanisms allow pitch/roll, but do not allow for an important 3rd motion (yaw) in the human ankle. Even if this yaw motion is not critical in a person's normal motion, different people have different nominal angles at which their feet point along this degree of freedom, making systems that do not allow yaw uncomfortable.

As another example, exoskeletons often use a pin joint to approximate the kinematics of the wearer's knees. A pin joint, however, overly simplifies the natural motion of the knee because the human knee is a rolling joint, not a pin joint.

SUMMARY

As mentioned above, exoskeletons often exhibit poor transparency due to one or more of kinematic misalignment, limited range of motion, mass, bulk, or lack of coupling between the human and exoskeleton. Thus, one way to increase transparency is to enable a close coupling between the exoskeleton and the human to minimize dynamics between the two. For example, it may be desirable, in some embodiments, to strap the exoskeleton to the wearer closely at multiple locations, such as the feet, the shins, the thighs, and the torsos. With this close coupling comes the need to closely match the human's kinematics.

What is desired, therefore, are exoskeletons and exoskeleton joints that more closely match the kinematics of human joints. To those ends, among others, embodiments of the present disclosure provide various mechanisms to better match the kinematics of human joints, such as the hip joint, ankle joint, and knee joint. Various embodiments may thus incorporate one or more of an enhanced transparency hip joint mechanism, an enhanced transparency ankle joint mechanism, or an enhanced transparency knee joint mechanism, or other features discussed herein.

According to one embodiment, the exoskeleton also includes a torso portion, a leg assembly, and a hip joint assembly connecting the leg assembly to the torso portion. The hip joint assembly may include a hip abduction/adduction to hip internal/external rotation to hip flexion/extension kinematic chain. In some embodiments, one or more of the hip abduction/adduction degree of freedom, hip flexion/extension degree of freedom, and hip internal/external rotation degree of freedom are active and one or more of the hip abduction/adduction degree of freedom, hip flexion/extension degree of freedom, and hip internal/external rotation degree of freedom are passive. In one example embodiment, the hip joint assembly has an active hip abduction/adduction degree of freedom, an active hip flexion/extension degree of freedom, and a passive hip internal/external rotation degree of freedom.

One general aspect includes an exoskeleton. The exoskeleton may be a load bearing exoskeleton in some embodiments. The exoskeleton includes a torso portion; a leg assembly; and a hip joint assembly connecting the leg assembly to the torso portion. The hip joint assembly may include a hip abduction/adduction joint defining a hip abduction/adduction axis. The hip joint assembly may also include a hip flexion/extension joint defining a hip flexion/extension axis. The hip joint assembly may also include a hip abduction/adduction actuator to drive abduction/adduction of the leg assembly about the hip abduction/adduction axis. The hip abduction/adduction actuator may be remote from the hip abduction/adduction axis. According to one embodiment, the hip abduction/adduction actuator is placed to be above a wearer's hips during use and closer to a centerline of the exoskeleton than the hip abduction/adduction axis. The hip joint assembly may also include a hip flexion/extension actuator to drive flexion and extension of the leg assembly about the hip flexion/extension axis. The hip flexion/extension actuator remote from the hip flexion/extension axis.

The exoskeleton may include a hip internal/external rotation mechanism coupled to the hip abduction/adduction joint and the hip flexion/extension joint. The hip internal/external rotation mechanism may be rotatable about the hip abduction/adduction axis to abduct/adduct the leg assembly. The hip internal/external rotation mechanism may define an internal/external rotation degree of freedom, where the internal/external rotation degree of freedom is passive.

The hip joint assembly may include: a scissor linkage coupled to the leg assembly and a hip abduction/adduction linkage coupled the hip abduction/adduction joint, the scissor linkage and the hip abduction/adduction actuator, where the hip abduction/adduction actuator is adapted to drive the hip abduction/adduction linkage to induce abduction/adduction of the scissor linkage about the hip abduction/adduction axis to abduct/adduct the leg assembly. In one embodiment, the hip abduction/adduction linkage is a four-bar linkage. The scissor linkage may be coupled to the hip abduction/adduction linkage by an intermediate linkage. The intermediate linkage may be a four-bar linkage. According to one embodiment, the scissor linkage defines a hip internal/external rotation axis for the leg assembly. The scissor linkage may be virtual center linkage.

The hip joint assembly may include: a hip flexion/extension linkage coupled to the hip flexion/extension joint, the scissor linkage, and the hip flexion/extension actuator, where the hip flexion/extension actuator is coupled to the leg assembly and adapted to drive the hip flexion/extension linkage to cause the leg assembly to flex/extend about the hip flexion/extension axis. According to one embodiment, the hip flexion/extension linkage is a four-bar linkage. The scissor linkage may be coupled to the hip flexion/extension linkage by an intermediate linkage. The intermediate linkage, according to one embodiment, is a four-bar linkage.

The scissor linkage may be coupled to the hip abduction/adduction linkage by a first intermediate linkage and to the hip flexion/extension linkage by a second intermediate linkage. According to one embodiment, the hip abduction/adduction linkage is a first four-bar linkage, the first intermediate linkage is a second four bar linkage, the hip flexion/extension linkage is a third four-bar linkage, and the second intermediate linkage is a fourth four-bar linkage.

The leg assembly may include: a lower leg assembly coupled to an upper leg assembly at a knee joint. The lower leg assembly may include an ankle joint and a footbed coupled to the ankle joint, the footbed having a rear portion behind the ankle joint. The leg assembly may further include ankle actuation cable adapted to lift the rear portion of the footbed. The upper leg assembly may include an ankle actuation motor to take in and release the ankle actuation cable, where taking in the ankle actuation cable induces planter flexion of the footbed.

The lower leg assembly may include a remote parallelogram structure coupled to the ankle joint, the remote parallelogram structure allowing for yaw of the footbed and inversion/eversion of the footbed. The ankle joint may include a first spherical joint and a second spherical joint and the lower leg assembly further may include a first parallel member running from the remote parallelogram structure to the first spherical joint and a second parallel member running from the remote parallelogram structure to the second spherical joint. According to one embodiment, the first parallel member and the second parallel member transmit force from the knee joint to the footbed.

The lower leg assembly may include a support structure adapted to remain in place relative to a wearer's leg when the exoskeleton is worn. The remote parallelogram structure may include: a first cross member coupled to the first parallel member, the second parallel member, and the support structure; and a second cross member parallel to the first cross member, the second cross member coupled to the first parallel member, the second parallel member, and the support structure.

According to one embodiment, the first cross member is coupled to the first parallel member at first pin joint, the support structure at a first spherical joint, and the second parallel member at a second pin joint and the second cross member is coupled to the first parallel member at a third pin, the support structure at a second spherical joint and the second parallel member at a fourth pin joint.

The exoskeleton may include a biasing member coupled to the first parallel member and the footbed to bias the rear portion of the footbed down. The footbed may include a first clevis for the first spherical joint and a second clevis for the second spherical joint, where the first clevis and the second clevis have a tapered profile to limit a range of motion of the footbed. The exoskeleton may include a load sensor disposed to sense a load indicative of tension in the ankle actuation cable.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

DETAILED DESCRIPTION

Figure 1:
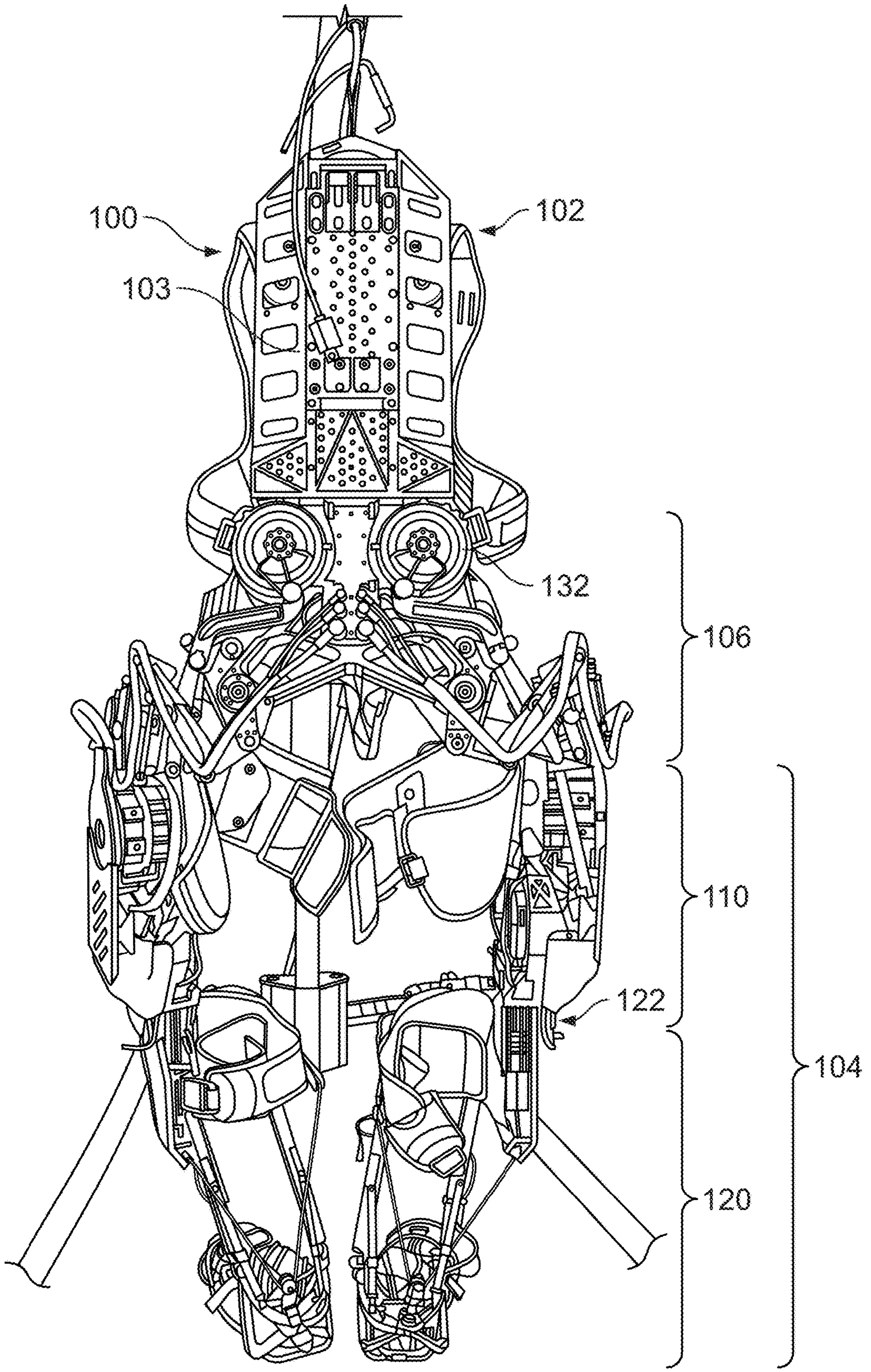
FIG. 1 is a rear view of one embodiment of an exoskeleton.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

Before discussing embodiments in more detail, a brief description of the context in which embodiments can be utilized may be helpful. There are many different types of exoskeletons, some load bearing (a continuous load path from the load to ground) and others non-load bearing (purely assisting various muscle groups). Embodiments of the present disclosure provide a load bearing exoskeleton and components thereof to enhance transparency. Embodiments may also be used in non-load bearing systems as well.

According to one aspect of the present disclosure, a load bearing, form-fitting exoskeleton designed to offload torso-mounted payload from the user while retaining agile and nimble locomotion and movements by the user is provided. One application for some embodiments of the exoskeleton is in high risk tasks where the user needs to move quickly while carrying payload, such as would be the case for a fire-fighter. The exoskeleton may exhibit closer kinematic alignment and enhanced transparency with respect to one or more of the wearer's hip, knee, or ankle joint.

In certain embodiments, one or more degrees-of-freedom (DOFs) at a hip, knee or ankle joint have an active degree-of-freedom (DOF) driven by an actuator. The actuator for a DOF can be spaced from the axis of rotation (i.e., can be a remote actuator for the DOF) and can drive rotation about the axis through a linkage, such as four-bar linkage (e.g., an inverted four-bar linkage, a parallelogram four-bar linkage or other four-bar linkage) other type of linkage. A remote actuator for a DOF may also actuate rotation through other mechanisms, such as a cable or other mechanism. Moving the actuators off-axis like this can reduce bulk and mass at the joints, making the exoskeleton easier to maneuver and more transparent to the wearer.

According to one aspect of the present disclosure, an exoskeleton comprises a 3-DOF hip joint mechanism that utilizes the following kinematic chain while maintaining kinematic alignment: abduction/adduction→internal/external rotation→flexion/extension (also referred to as a hip abduction/adduction to hip internal/external rotation to hip flexion/extension kinematic chain herein). This kinematic chain avoids gimbal lock throughout the full workspace of the wearer's leg. In some embodiments, one or more DOFs are passive. For example, in one embodiment, the abduction/adduction and flexion/extension DOFs are active, whereas the internal/external rotation DOF is a passive DOF. In other embodiments, the internal/external rotation DOF is also an active DOF.

In one embodiment, an abduction/adduction actuator is spaced from the abduction/adduction joint and drives rotation about the abduction/adduction joint using a four-bar linkage, such as parallelogram four-bar linkage, an inverted four-bar linkage or other four-bar linkage, or other linkage. In addition, or in the alternative, the flexion/extension actuator is spaced from a flexion/extension joint and drives rotation about the joint using a four-bar linkage, such as parallelogram four-bar linkage, an inverted four-bar linkage or other four-bar linkage, or other linkage. In addition, or in the alternative, an internal/external rotation actuator is spaced from a joint and drives rotation about the joint using a four-bar linkage, such as parallelogram four-bar linkage, an inverted four-bar linkage or other four-bar linkage, or other linkage.

In some embodiments, the internal/external rotation DOF of the exoskeleton's hip joint mechanism is provided by a "virtual center mechanism". As will be appreciated, virtual center mechanisms follow a curved motion (for example, a generally circular motion), but do not require any structure or joints inside some radius R away from the center point. A virtual center mechanism can provide a degree of freedom that is approximately coincident (including coincident) with that of the human's hip, without violating the human envelope. One example of a virtual-center mechanism is described in International Patent Publication Number 2019/076417 A1, entitled "Compact Spherical 3-DOF Mechanism Constructed with Scissor Linkages," by Castro et al., having an international filing date of Oct. 17, 2018, which is hereby fully incorporated by reference herein.

In particular embodiments, the internal/external rotation DOF is provided by a load-bearing virtual center scissor mechanism with a virtual center selected to be approximately coincident with the wearer's hips. In even more particular embodiments, the internal/external rotation DOF is provided by a load-bearing spherical scissor mechanism that allows hip internal/external rotation with minimal volume. As will be appreciated, the scissor mechanism can be configured such that the linkage moves on the surface of an imaginary sphere having a radius R to achieve a desired range of motion. According to one embodiment, the desired range of motion is approximately 55 degrees, though other ranges of motion may be used.

Figure 2:
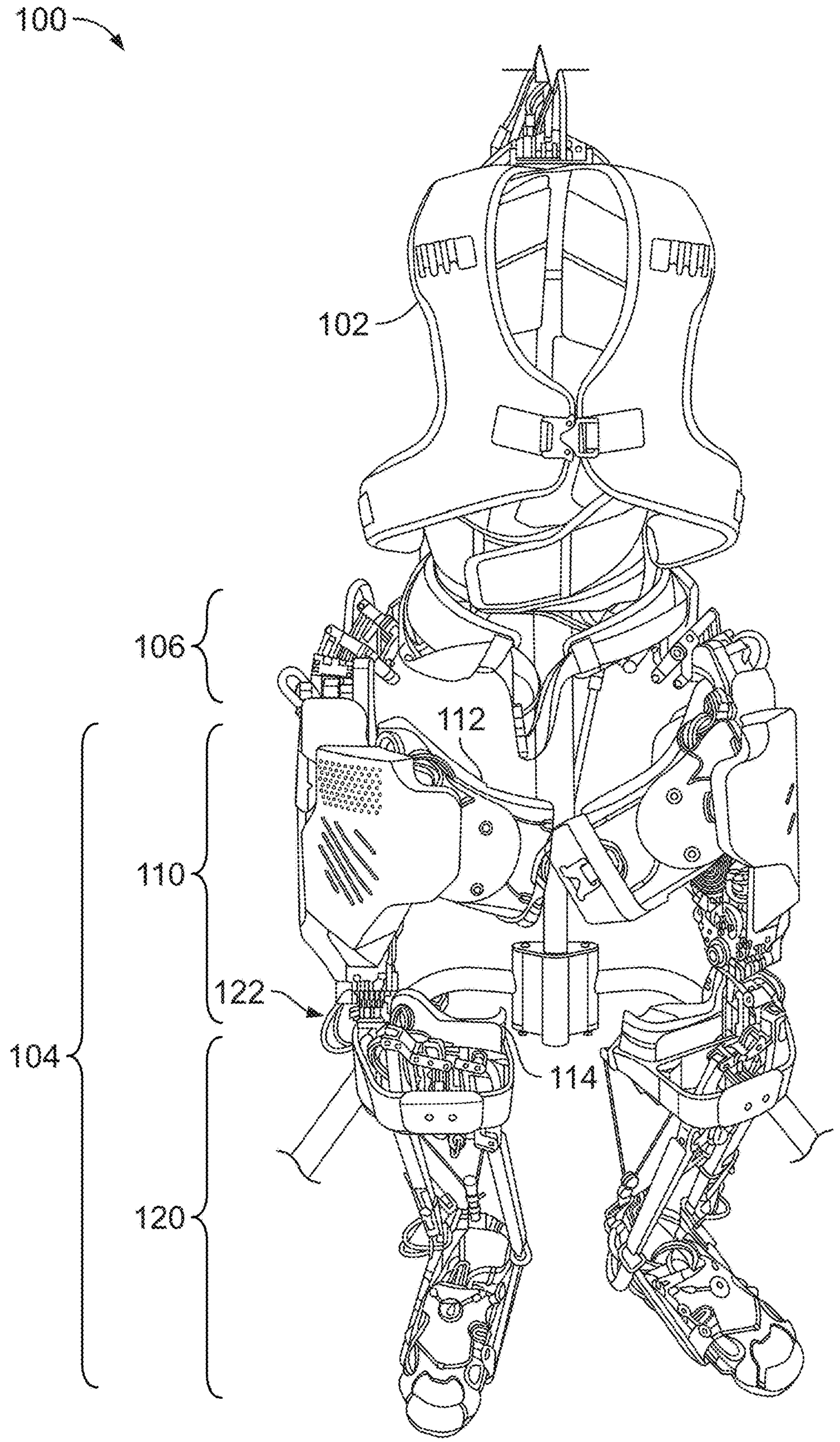
FIG. 2 is a front view of one embodiment of an exoskeleton.
Figure 3:
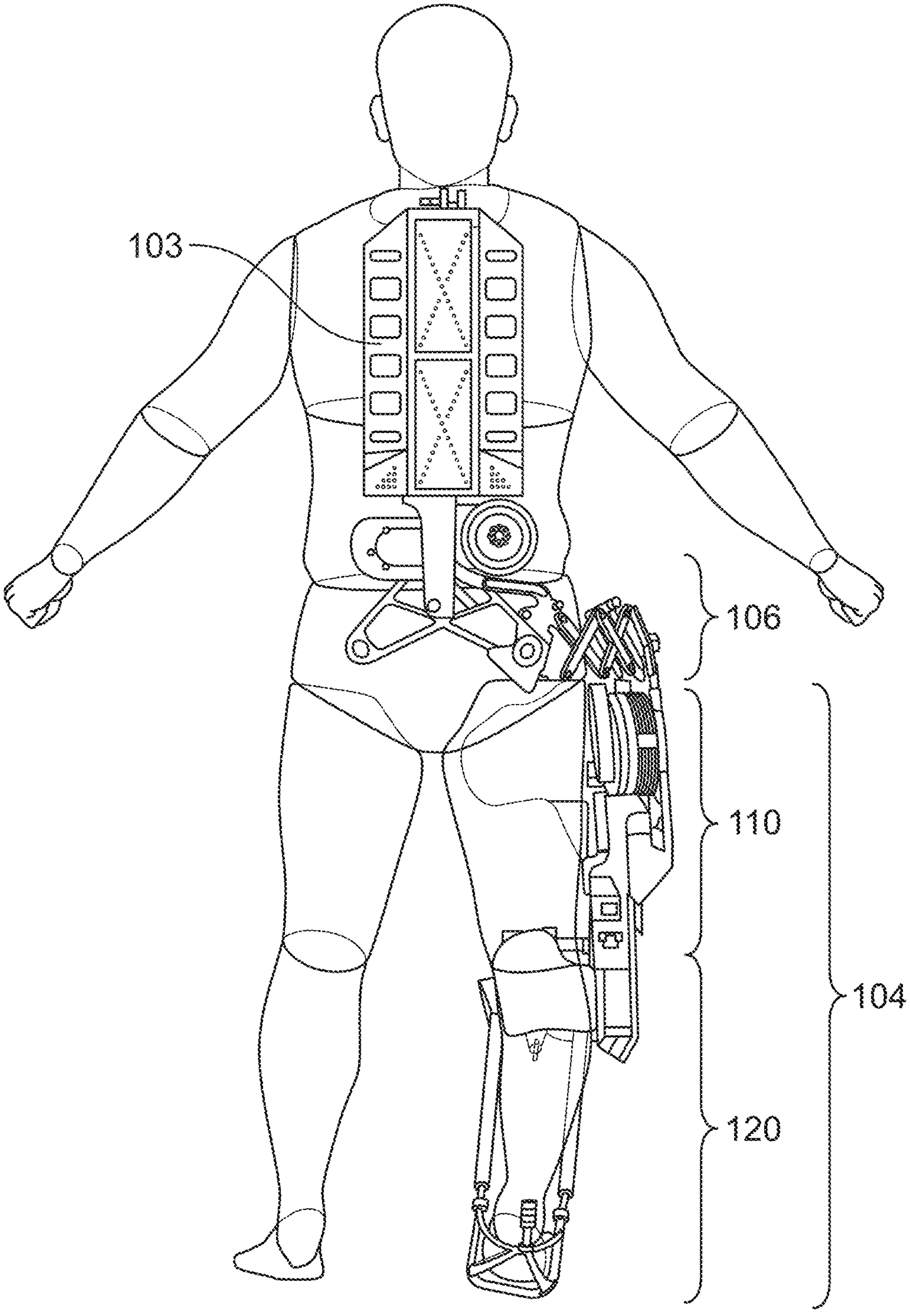
FIG. 3 is diagrammatic representation of a rear view of a wearer and a portion of one embodiment of an exoskeleton.
Figure 4:
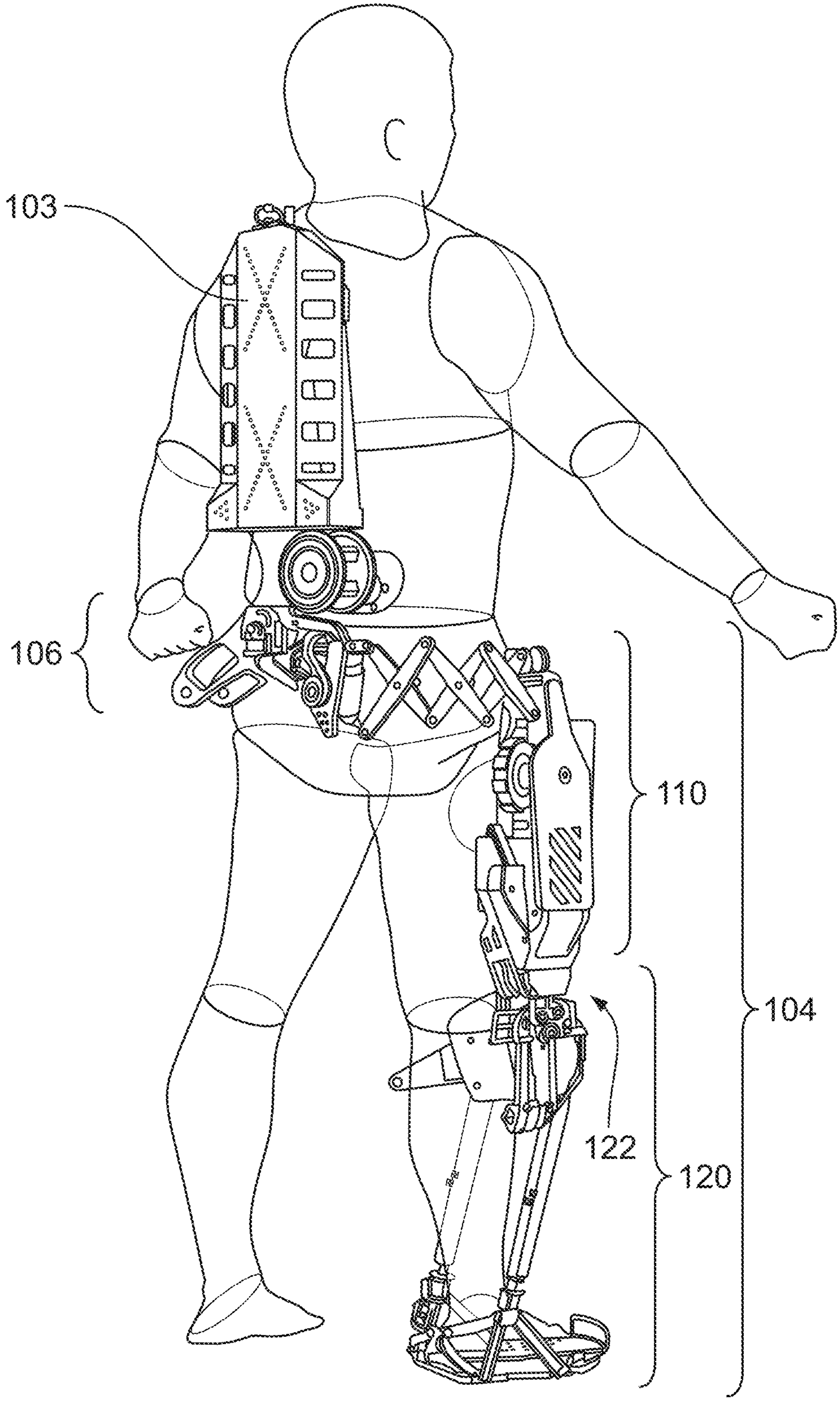
FIG. 4 is diagrammatic representation rear oblique view of a wearer and a portion of one embodiment of an exoskeleton.
Figure 5:
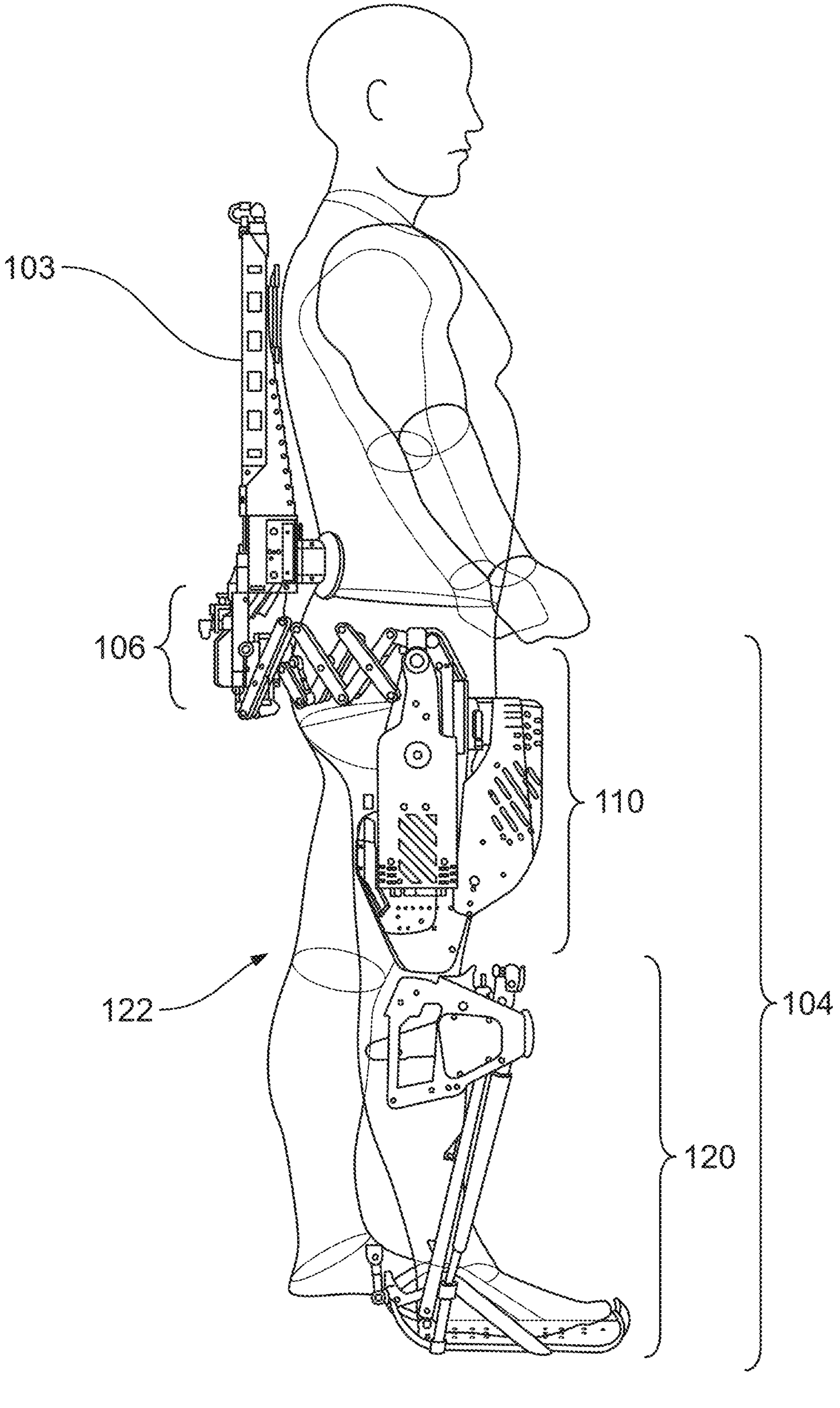
FIG. 5 is diagrammatic representation of a side view of a wearer and a portion of one embodiment of an exoskeleton.
Figure 6:
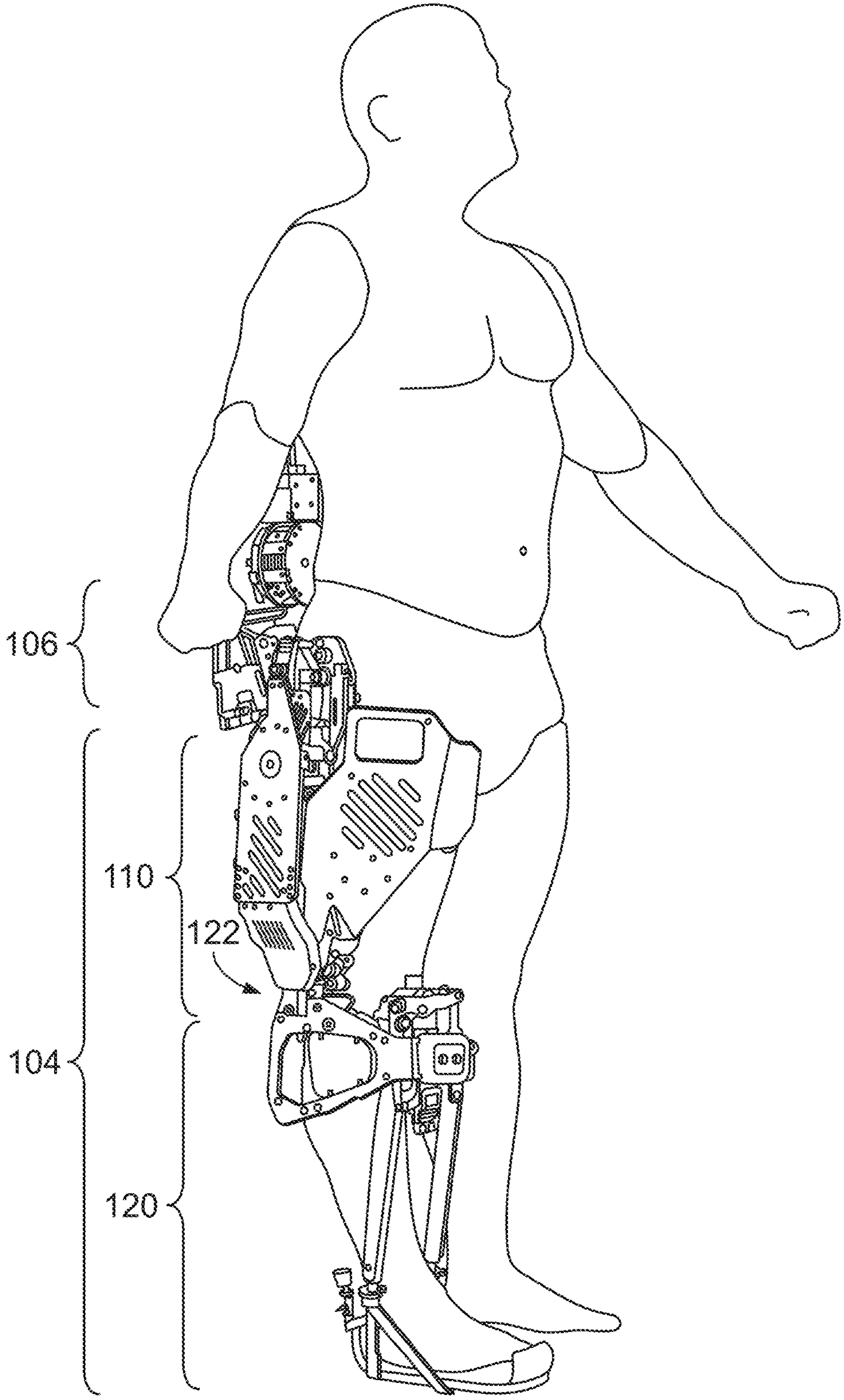
FIG. 6 is diagrammatic representation of a front oblique view of a wearer and a portion of one embodiment of an exoskeleton.
Figure 7:
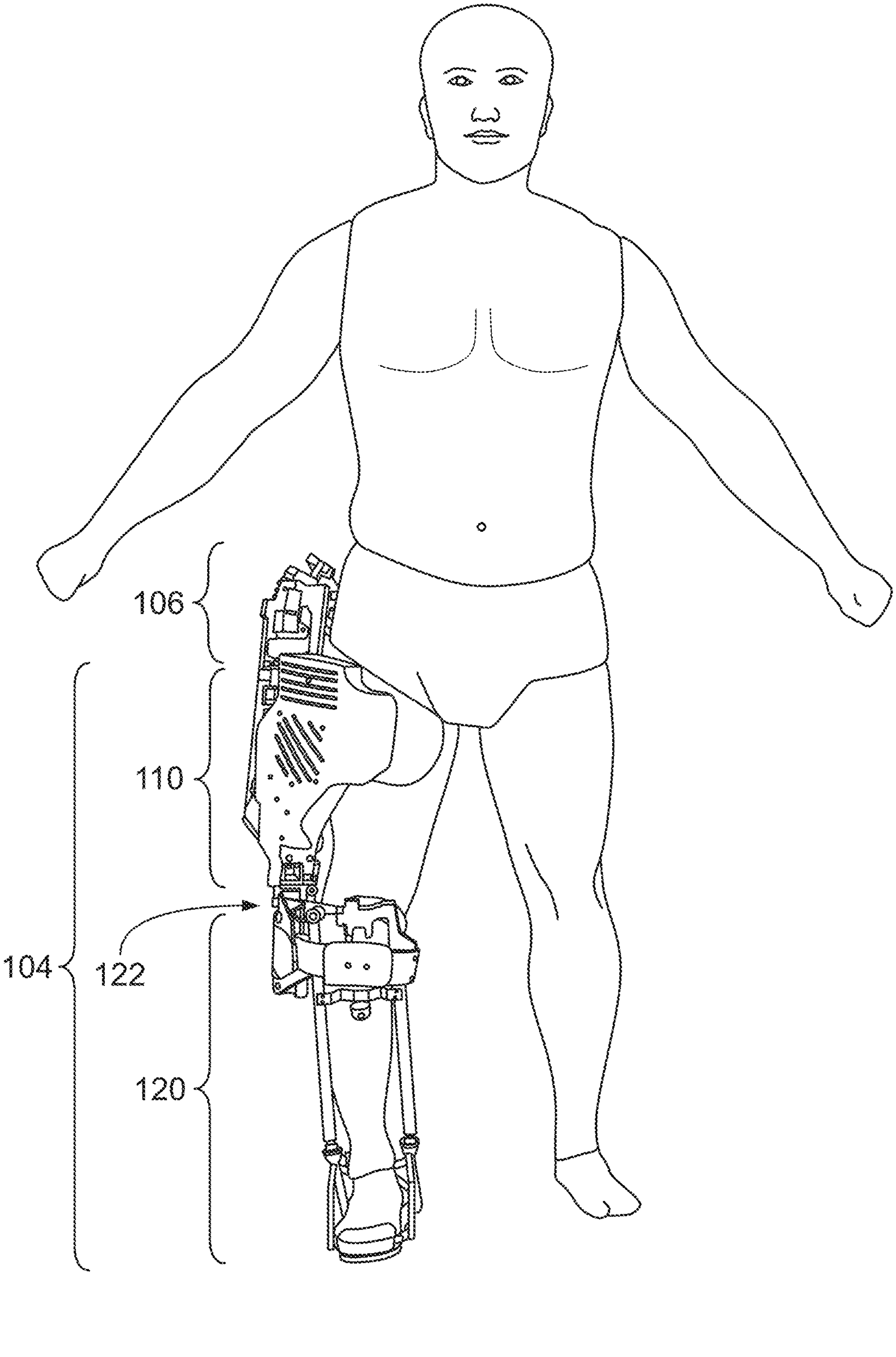
FIG. 7 is diagrammatic representation of a front view of a portion of a wearer and a portion of one embodiment of an exoskeleton.
Figure 8A:
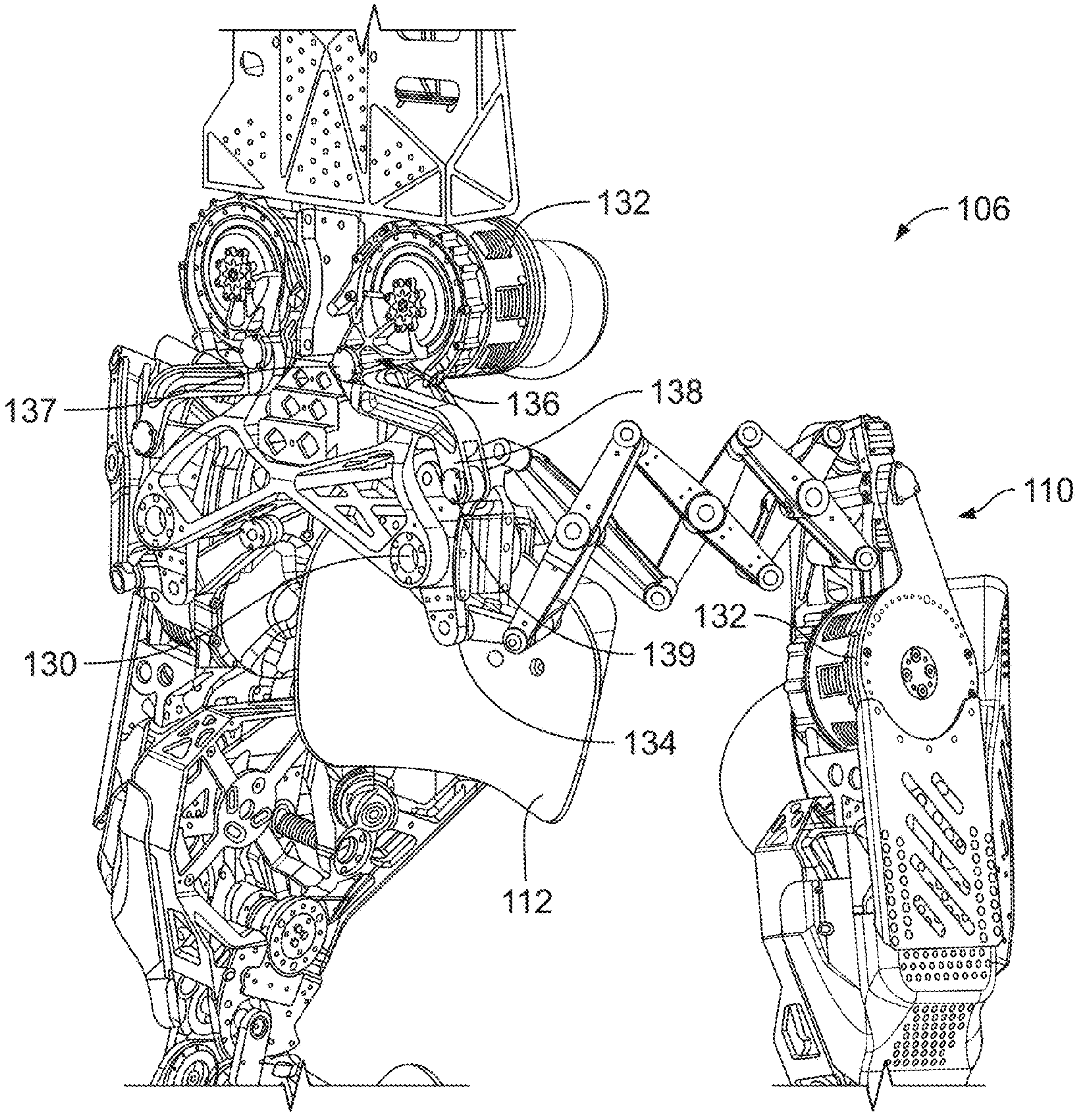
FIG. 8A is diagrammatic representation of a rear oblique view of one embodiment of a hip mechanism.
Figure 8B:
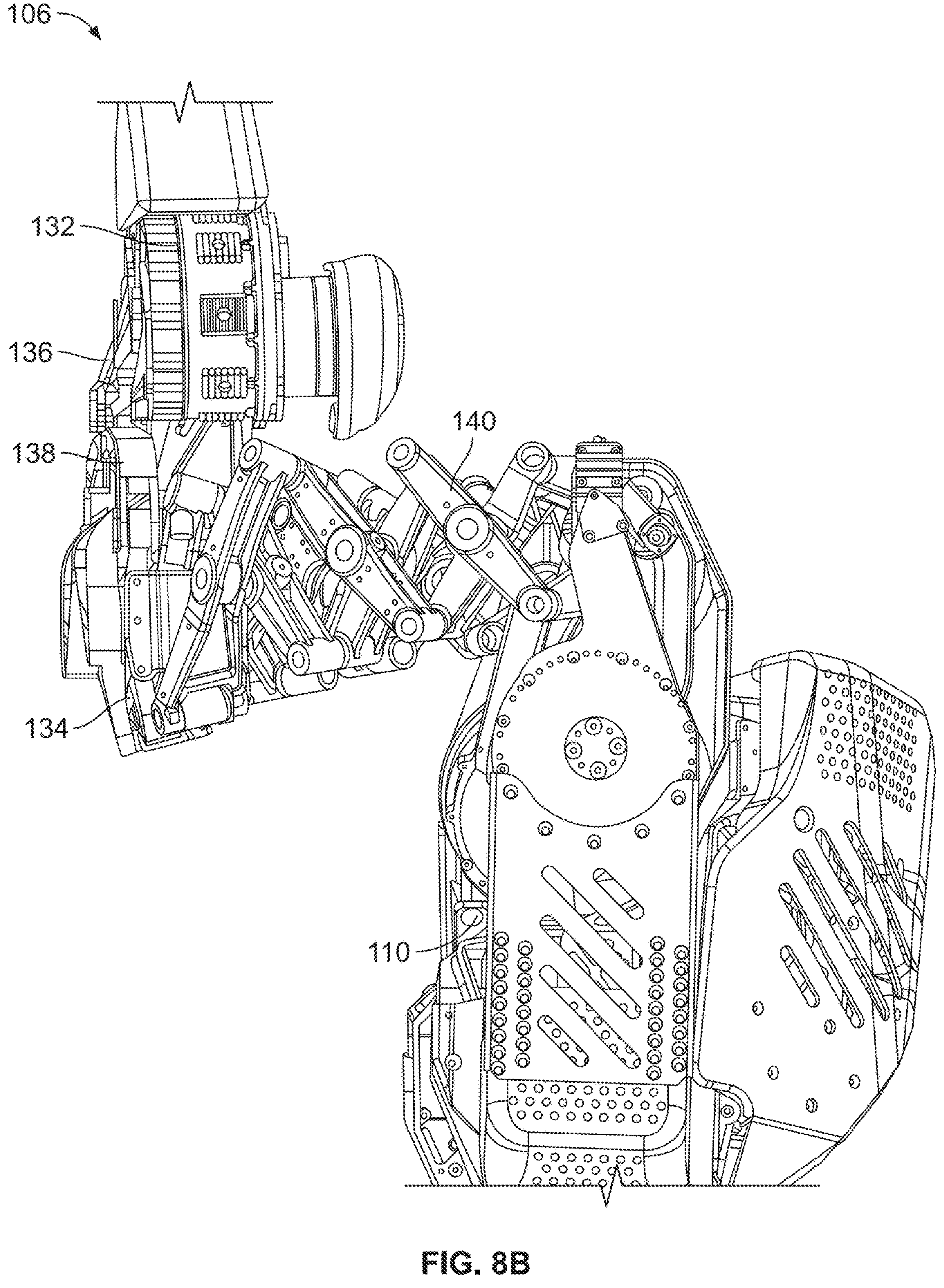
FIG. 8B is diagrammatic representation of a side view of one embodiment of a hip mechanism.
Figure 9A:
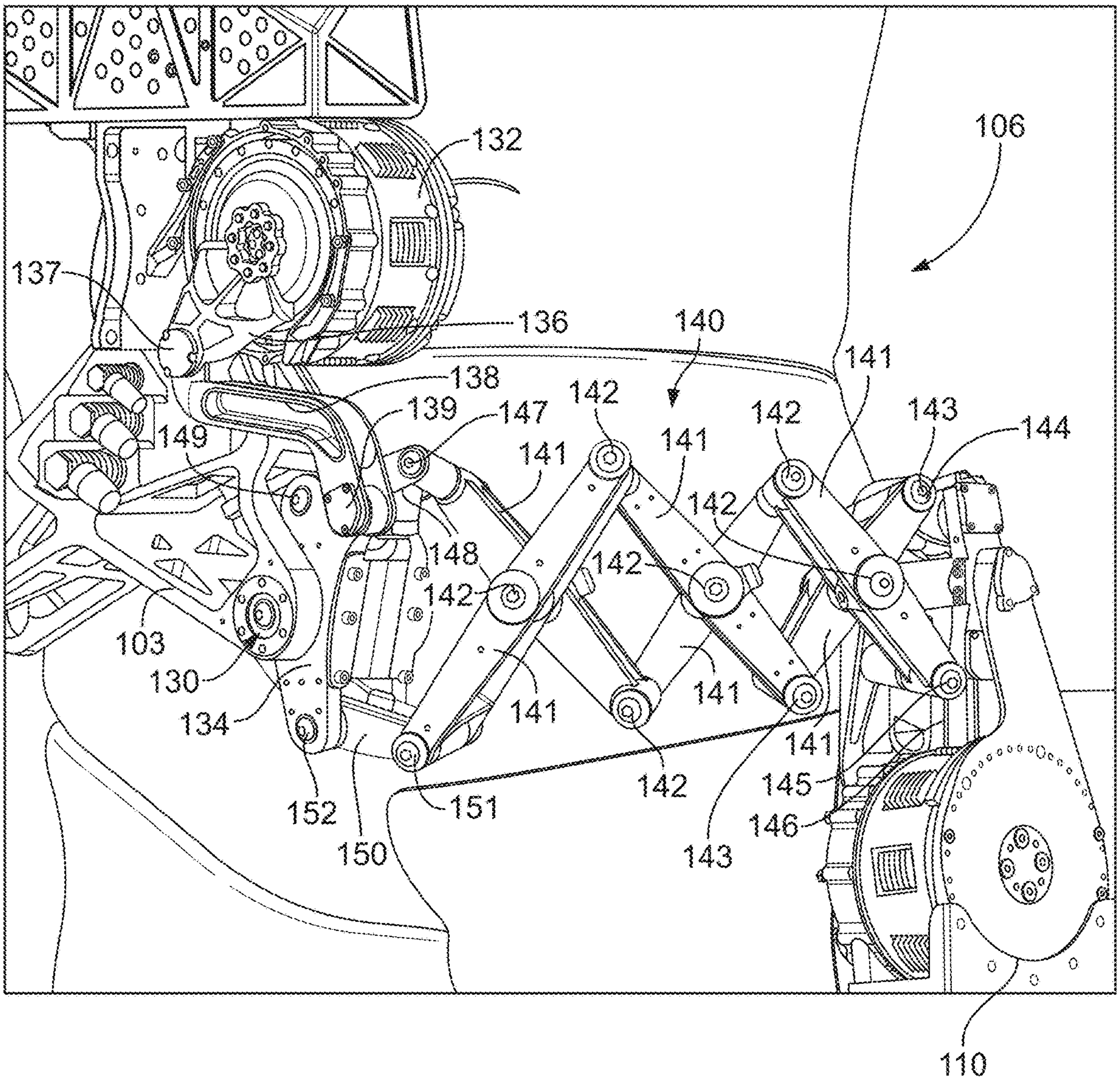
FIG. 9A is a diagrammatic representation of an oblique rear view of a wearer and one embodiment of a hip joint mechanism and FIG. 9B further illustrates one embodiment of a four-bar linkage formed by various links of FIG. 9A.
Figure 9B:
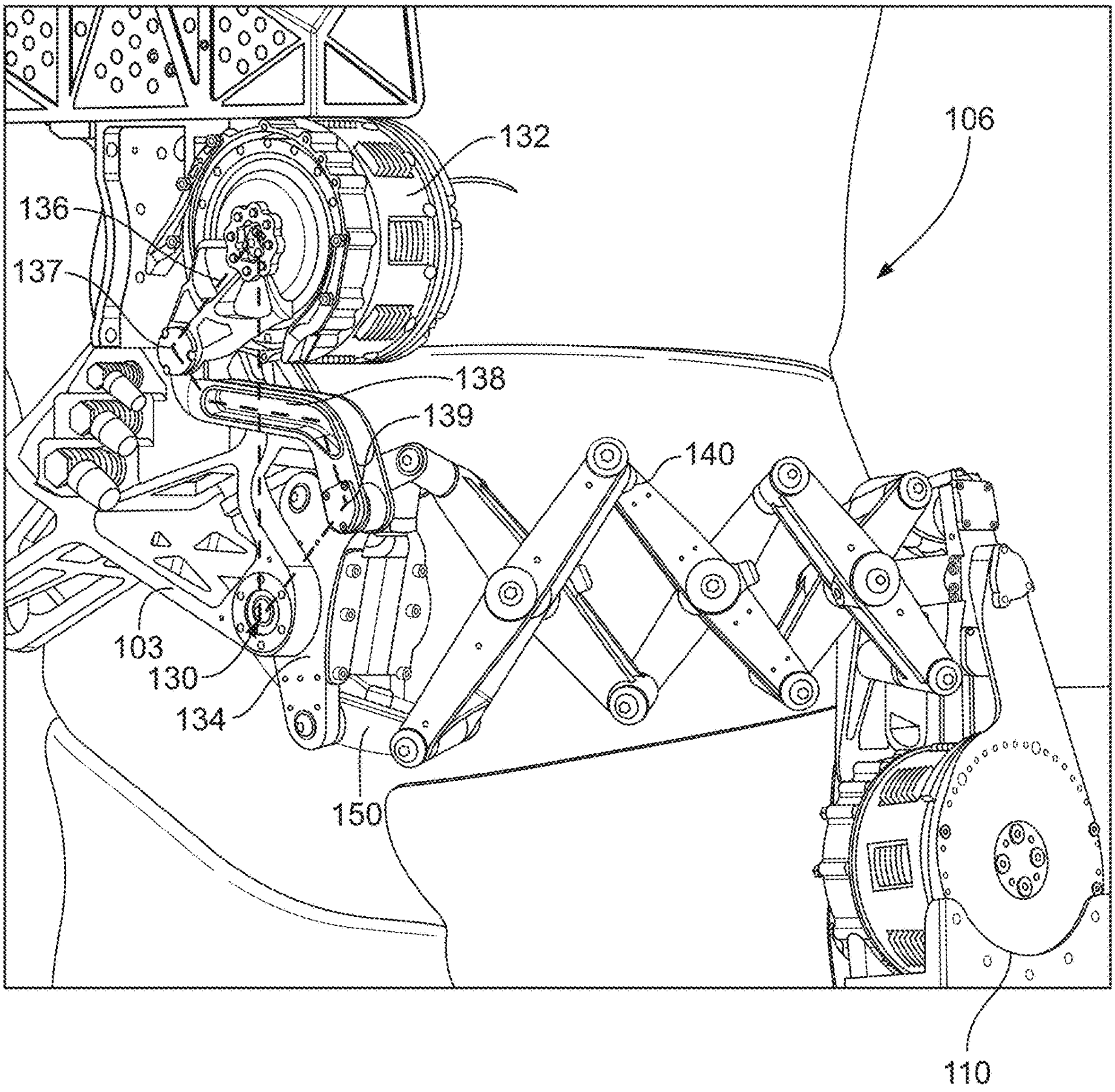

Attention is now directed to example embodiments of exoskeleton systems. FIG. 1 is a rear view of one embodiment of an exoskeleton, FIG. 2 is a front view of one embodiment of an exoskeleton, FIG. 3 is diagrammatic representation of a rear view of a wearer and a portion of one embodiment of an exoskeleton, FIG. 4 is diagrammatic representation rear oblique view of a wearer and a portion of one embodiment of an exoskeleton, FIG. 5 is diagrammatic representation of a side view of a wearer and a portion of one embodiment of an exoskeleton, FIG. 6 is diagrammatic representation of a front oblique view of a wearer and a portion of one embodiment of an exoskeleton and FIG. 7 is diagrammatic representation of a front view of a portion of a wearer and a portion of one embodiment of an exoskeleton.

Exoskeleton 100 is a lower extremity exoskeleton device. Exoskeleton 100 includes a backpack 102 coupled to a pair of leg assemblies 104. Each leg assembly 104 includes an upper leg subassembly 110 and a lower leg subassembly 120 joined at a knee joint 122. The leg assemblies include pads (e.g., pad 112, pad 114) against which the wearer's legs can be tightly strapped. Backpack 102 can be used to carry electronics and other components. In some embodiments, backpack 102 includes a support structure 103 to which an external backpack can be attached to carry a large weight. Load from backpack 102 is transmitted through a load path to ground in parallel to the wearer's legs. Backpack 102 may thus be used to carry a large amount of weight that will be borne by exoskeleton 100 and not felt by the wearer.

Backpack 102 is coupled to the pair of leg assemblies 104 at respective hip joint mechanisms 106. According to one aspect of the present disclosure, each hip joint mechanism 106 employs the following kinematic chain: abduction/adduction→internal/external rotation→flexion/extension. According to one embodiment, hip joint mechanism 106 includes an abduction/adduction mechanism that is coupled to an internal/external rotation mechanism that is coupled, in turn, to a flexion/extension mechanism. In some embodiments, the abduction/adduction mechanism is attached to the backpack 102 or otherwise grounded to the torso and is connected by a linkage to a flexion/extension mechanism in the upper leg subassembly 110. The linkage allows for internal/external rotation.

FIG. 8A, FIG. 8B, FIG. 9A and FIG. 9B, are diagrammatic representations of one embodiment of a hip joint mechanism 106, which comprises an abduction/adduction mechanism connected by a scissor mechanism 140—more particularly, a scissor linkage—to a flexion/extension mechanism in the upper leg subassembly 110. According to one embodiment, hip joint mechanism 106 and upper leg subassembly provide active abduction/adduction and flexion/extension DOFs, while scissor mechanism 140 provides a passive internal/external rotation DOF.

The abduction/adduction mechanism comprises a hip abduction/adduction joint 130 which defines a hip abduction/adduction axis of rotation—for example, a hip sagittal axis—about which portions of hip joint mechanism 106 can rotate to swing leg assembly 104 away from or toward the wearer's midline. An abduction/adduction actuator 132 is provided to induce rotation at a hip abduction/adduction joint 130 and abduct/adduct leg assembly 104. In one embodiment, abduction/adduction actuator 132 is a series elastic actuator. Abduction/adduction actuator 132 may be positioned away from hip abduction/adduction joint 130 and drive rotation through a linkage. Moving the actuator off axis with joint 130 helps reduce bulk at the hips of the exoskeleton. Moreover, moving the actuator closer to the wearer's midline moves the mass of the actuator closer to the center of mass of the exoskeleton as a whole. Preferably, the axis of hip abduction/adduction joint 130 is aligned with or closely aligned with the wearer's abduction/adduction axis of rotation.

In the illustrated embodiment of FIG. 8A, FIG. 8B, FIG. 9A and FIG. 9B, abduction/adduction actuator 132 drives a hip abduction/adduction four-bar linkage-more particularly, an inverted four-bar linkage—to induce rotation about joint 130. The four-bar linkage is generally indicated by dashed lines in FIG. 9B. The four-bar linkage comprises an output member 136 connected to the output of abduction/adduction actuator 132. Output member 136 is coupled at a revolute joint 137 to member 138, which provides a second bar of the four-bar linkage. Joint member 138 is coupled at a revolute joint 139 to joint member 134, which provides a third bar of the four-bar linkage. Revolute joint 139 is spaced from hip abduction/adduction joint 130 about which joint member 134 rotates. Actuator 132 is grounded to support structure 103 (e.g., a torso portion) and is in a fixed position relative to joint 130. Thus, a portion of support structure 103 acts as the fourth bar of the four-bar linkage, and more particularly as a ground linkage of the four-bar linkage linking hip abduction/adduction actuator 132 to joint 130. Abduction/adduction actuator 132 rotates member 136, which drives member 138, which drives joint member 138 in turn. As abduction/adduction actuator 132 rotates member 136 clockwise, member 134 will rotate counterclockwise about hip abduction/adduction joint 130 and as abduction/adduction actuator 132 rotates joint member 136 counterclockwise, member 134 will rotate clockwise about hip abduction/adduction joint 130.

A first end of scissor mechanism 140 is coupled to member 134. Rotation of member 134 causes the scissor mechanism 140 to swing the leg assembly 104 out or in—that is, to adduct or abduct, depending on the direction of rotation. Rotating joint member 134 clockwise (when viewed from the rear) will cause the leg assembly 104 to adduct and rotating joint member 134 counterclockwise (when viewed from the rear) will cause the leg assembly to abduct.

Scissor mechanism 140 is a load-bearing virtual-center scissor mechanism (e.g., a spherical scissor mechanism) with the virtual center selected to be approximately coincident with the wearer's hips. Scissor mechanism comprises a set of end links, examples of which are discussed below, and intermediate scissor links 141. According to one embodiment, the intermediate scissor links 141 are arranged to form the sides of at least one rhombus or of at least one parallelogram. Each intermediate scissor link has a first end and a second end and is rotationally connected to at least one of the other intermediate scissor link 141 via a revolute joint 142 at or near the first end of the scissor link or the second end of the scissor link or at an intermediate point between the first end and the second end, and is rotationally connected to at least another one of the scissor links 141 via another revolute joint 142 at or near the first end of the scissor link or the second end of the scissor link or at an intermediate point between the first end and the second end.

At the end of scissor mechanism 140 proximate to the hip abduction/adduction joint 130, a first intermediate scissor link 141 is coupled at revolute joint 147 to a joint member 148. Joint member 148 is coupled to member 134 at revolute joint 149. Similarly, a second scissor link 141 is coupled to member 150 at revolute joint 151 and member 150 is coupled to member 134 at revolute joint 152. The portion of member 148 between revolute joints 147 and 149 and the portion of member 150 between revolute joints 151 and 152 may be considered end scissor links. The scissor mechanism may also include end scissor links at the other end of the mechanism. At the end of scissor mechanism 140 proximate distal from hip abduction/adduction joint 130—that is, at the end coupled to upper leg subassembly 110-*a* first intermediate scissor link 141 is connected to member 144 at revolute joint 143 and a second intermediate scissor link 141 is connected to member 146 at revolute joint 145. Portions of member 144 and member 144 may also be considered end scissor links.

In general, the intermediate scissor links 141 are shaped, dimensioned, and arranged so that the axes of all said revolute joints 142 coincide at a virtual center (a common center of motion). Additionally, the intermediate scissor links 141 (and potentially one or more of members 148, 150, 144, 146) may be shaped, dimensioned, and arranged so that the axes of one or more of said revolute joints 147, 151, 143, 145 also coincide with the virtual center. As will be appreciated, scissor mechanism 140 can be configured such that the scissor links 141 move on the surface of an imaginary sphere having a radius R to achieve a desired range of motion. The scissor mechanism 140 defines a hip internal/external axis of rotation—for example, a hip longitudinal axis—that passes through the virtual center and preferably falls at or near the longitudinal axis of the wearer's thigh. When the wearer does an internal/external rotation motion with the wearer's hip, the scissor mechanism 140 expands or contracts so that the leg assembly 104 rotates with the wearer's leg.

Scissor mechanism 140 is just one example of a virtual-center mechanism that may be used to provide an internal/external rotation DOF, and other mechanisms may also be provided. In some embodiments, the internal/external rotation DOF is an active DOF.

Figure 21:
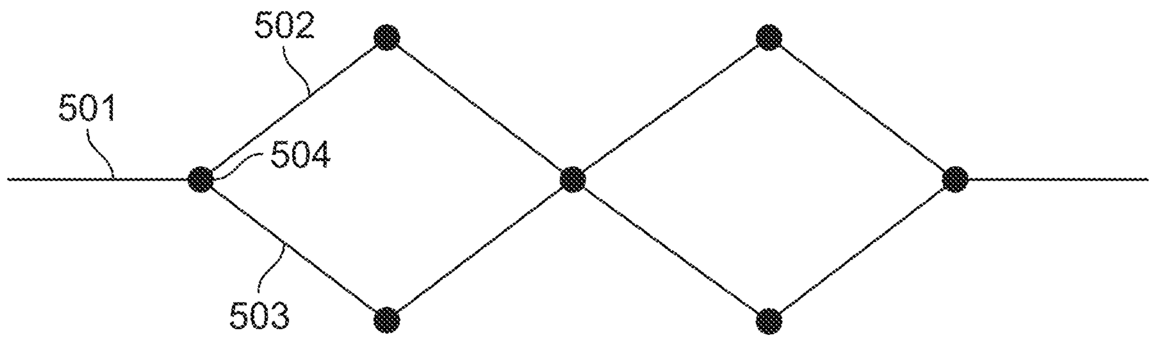
FIG. 21 is a diagrammatic representation of one embodiment of a scissor mechanism in which the end links share a pin joint with a third link.
Figure 22:
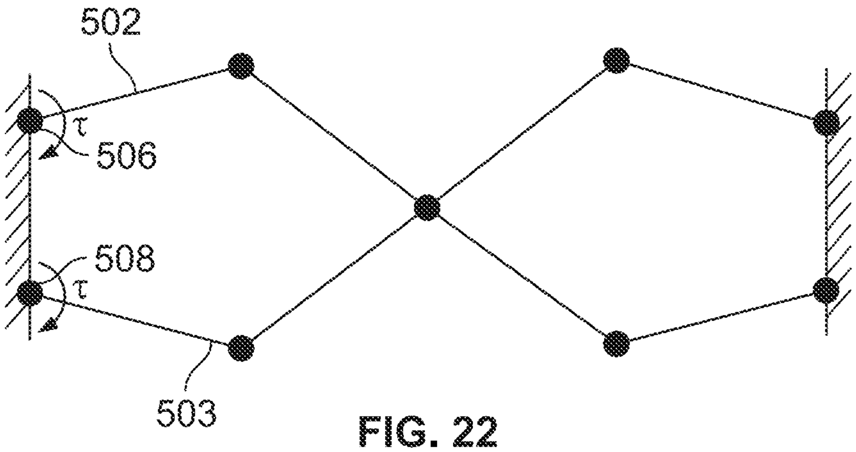
FIG. 22 illustrates an example embodiment of a scissor mechanism where end links of the scissor mechanism no longer share a pin joint, but are driven by separate actuators.
Figure 23:
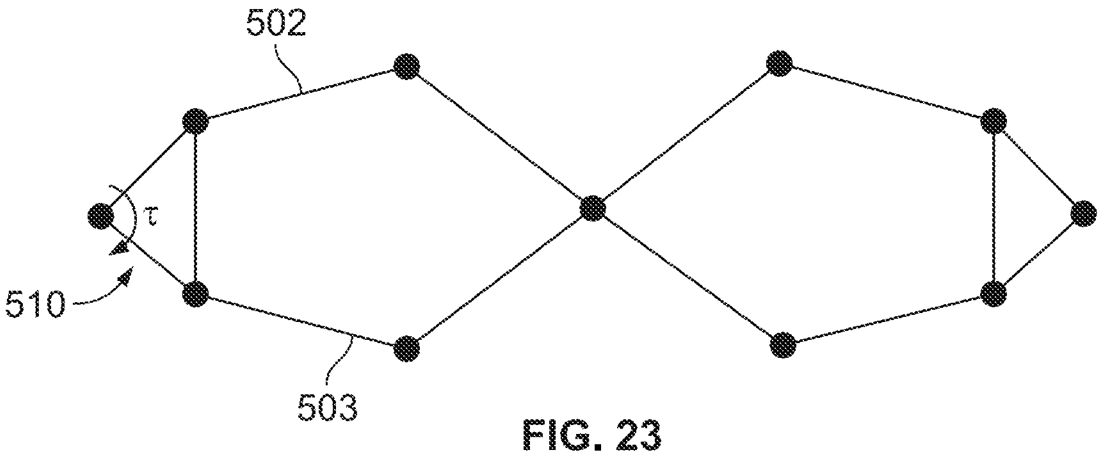
FIG. 23 is a diagrammatic representation of one embodiment of a scissor mechanism coupled using an intermediate link mechanism.

There are a number of options for terminating the scissor mechanism 140. There are many options for terminating the scissor mechanism 140. Turning briefly to FIG. 21, in one embodiment, link 502 and link 503 at a first end of a scissor mechanism are joined to a third link 501 at a single pin joint 504. A similar arrangement is used on the other end. Multiple actuators would be needed to actuate this joint, each grounded to link 501 and then actuating either link 502 or link 503. The embodiment depicted in FIG. 22 is similar to that of FIG. 21 but breaks apart this pin joint into two separate pin joints (pin joint 506 and pin joint 508). Again, multiple actuators are required to move link 502 and link 503. The embodiment of FIG. 23 adds an intermediate link mechanism 510 to join link 502 and link 503 together. For example, a linkage or gearing can be used to couple links together to create a mechanism that can pass loads but is also actuatable.

Figure 24:
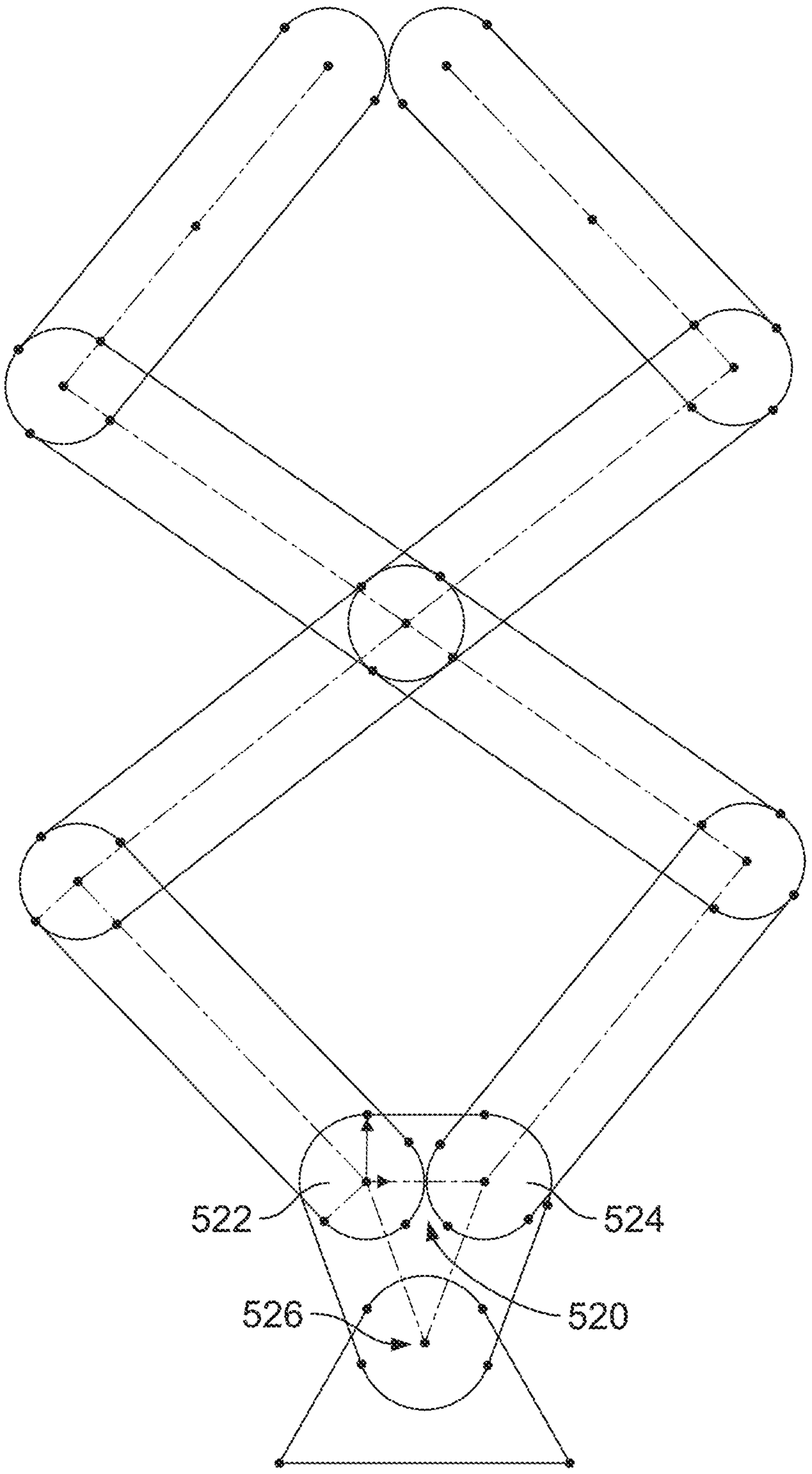
FIG. 24 illustrates an embodiment using a coupling linkage to couple the end scissor links together.

FIG. 24 illustrates an example where end links of the scissor mechanism no longer share a pin joint. In this example embodiment, the end links of the scissor mechanism are coupled to an intermediate link mechanism 520 at joint 522 and joint 524 respectively. The intermediate link mechanism 520 is coupled to an actuated joint 526. According to one embodiment, intermediate link mechanism 520 comprises gears, and intermediate linkage or other mechanism to provide an intermediate link to couple the end scissor links together.

Figure 25:
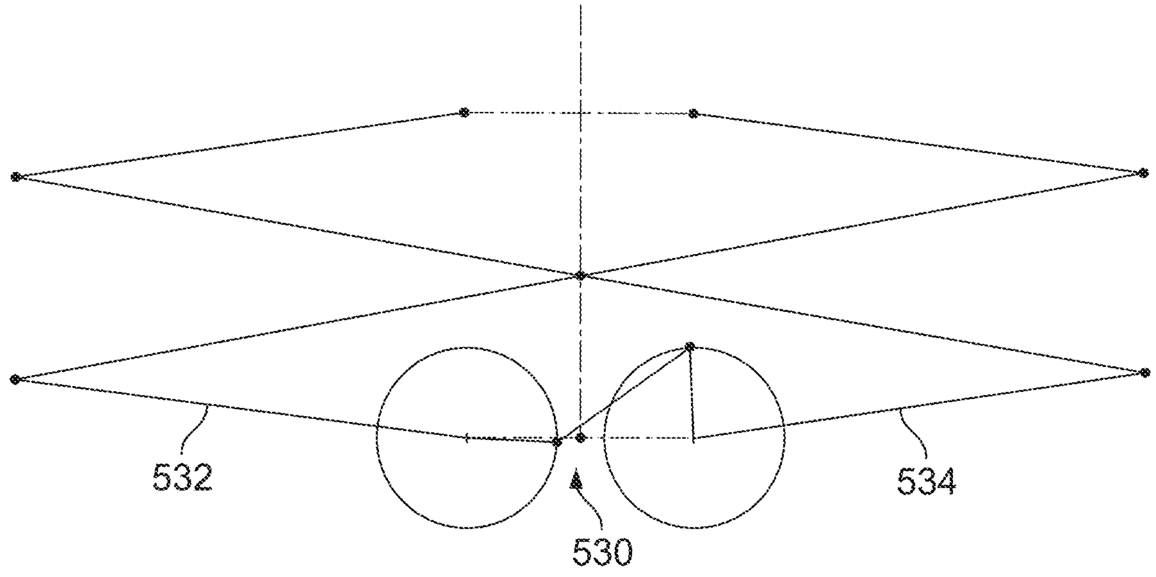
FIG. 25 illustrates an embodiment of a scissor mechanism in a contracted state.
Figure 26:
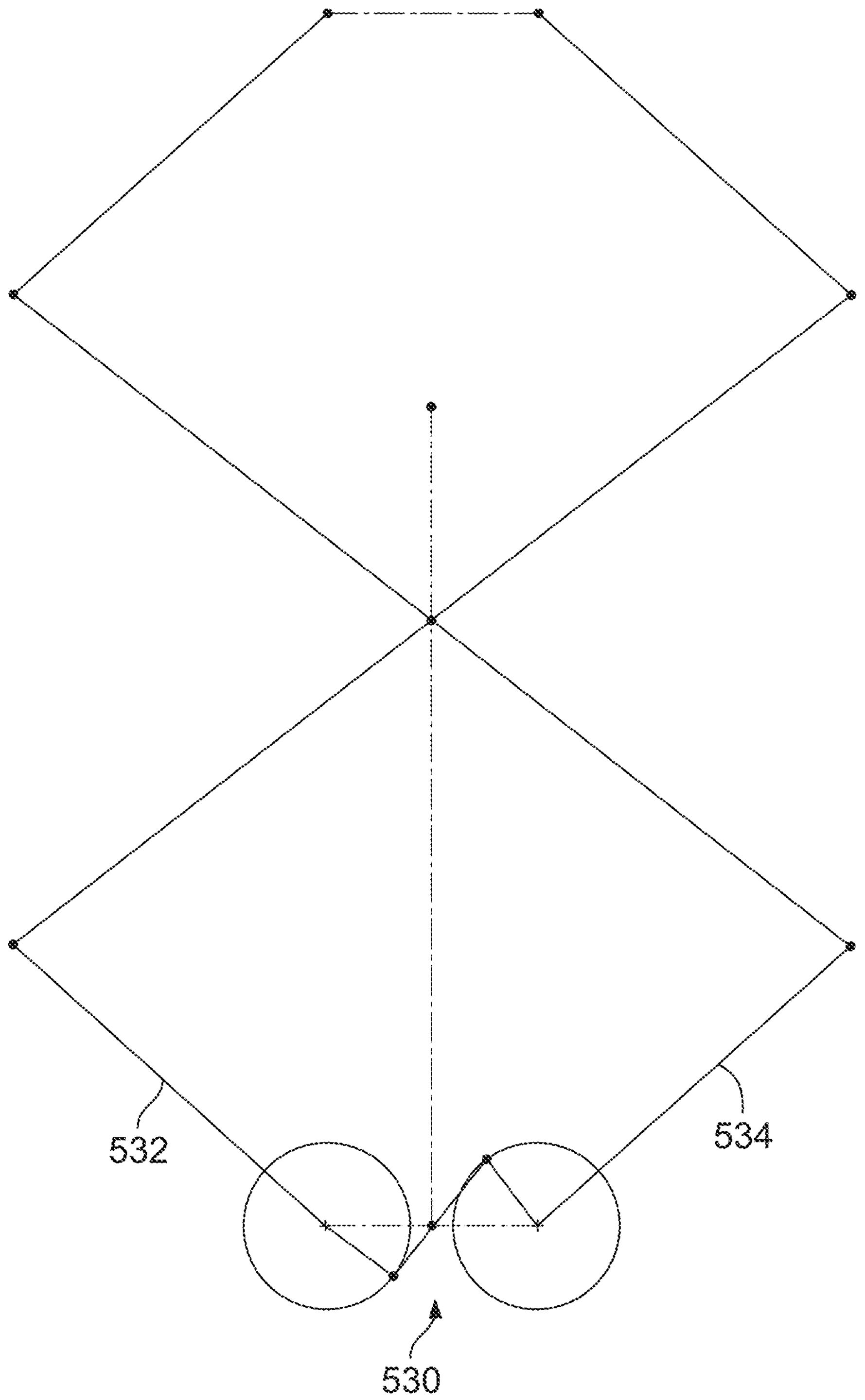
FIG. 26 illustrates an embodiment of a scissor mechanism in a mid-state.
Figure 27:
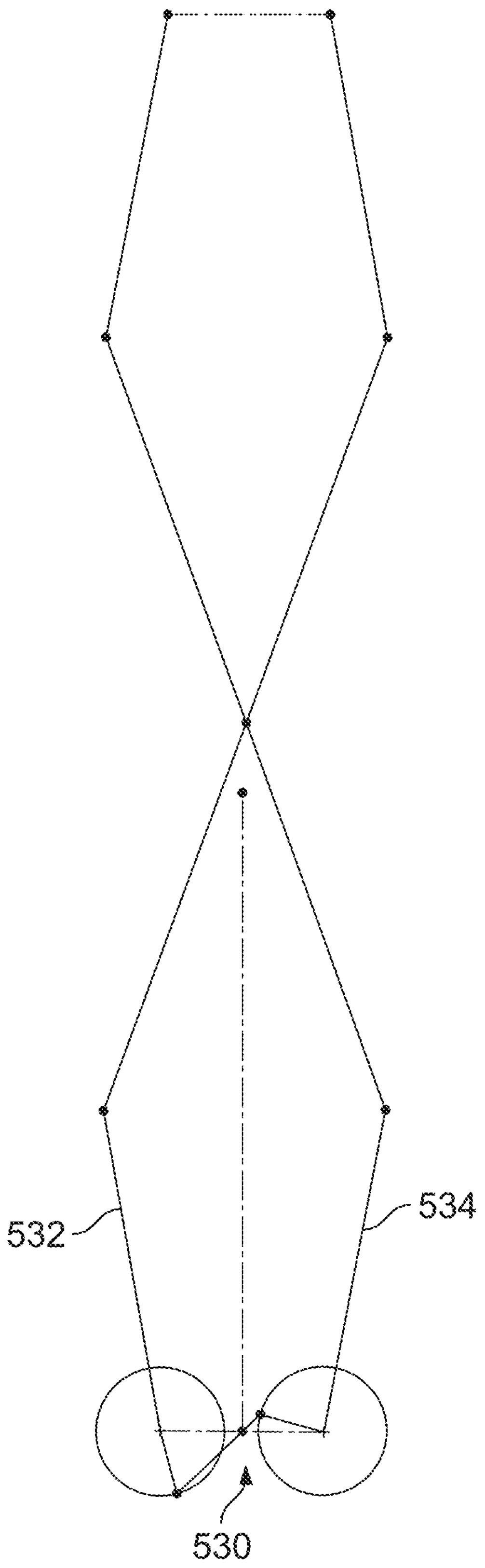
FIG. 27 illustrates an embodiment of a scissor mechanism in an extended state.
Figure 28:
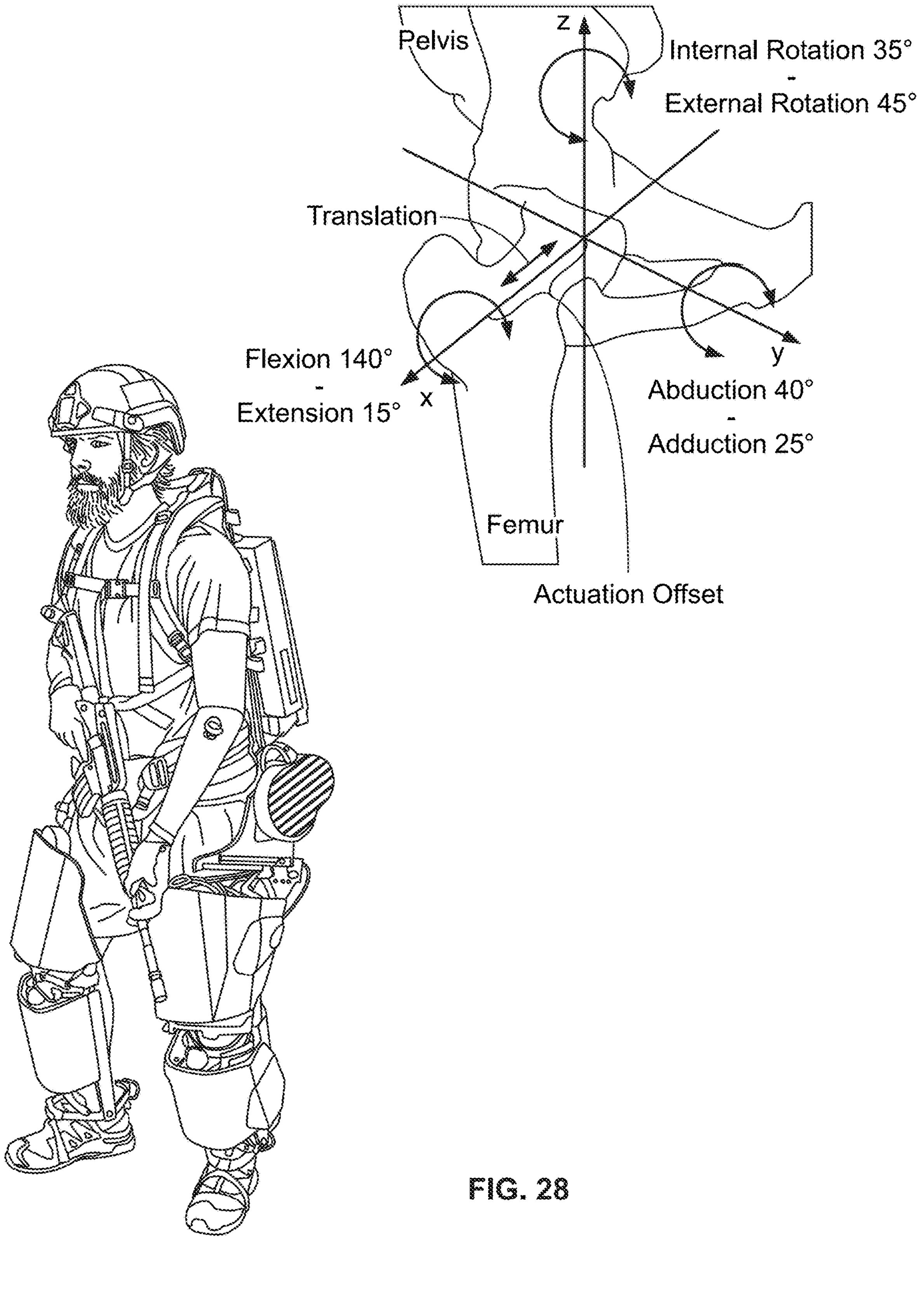
FIG. 28 illustrates an embodiment of an exoskeleton that could experience gimbal lock.

FIG. 25 illustrates an embodiment using a coupling linkage 530 to couple the end scissor links (e.g., scissor link 532 and scissor link 534) together. FIG. 26 illustrates the scissor mechanism of FIG. 25 at with a coupling linkage at a first level of extension and FIG. 27 illustrates a scissor mechanism the scissor mechanism in an extended state.

As will be appreciated then, embodiments may use a variety of scissor mechanisms. In some embodiments, the exoskeleton employs a scissor mechanism that, when compared to FIG. 21, separates the 3-body pin joint, and adds an intermediate link. As discussed above, coupling between scissor links can be achieved using a coupling linkage or in other ways, such as, but not limited to, gearing.

Figure 10A:
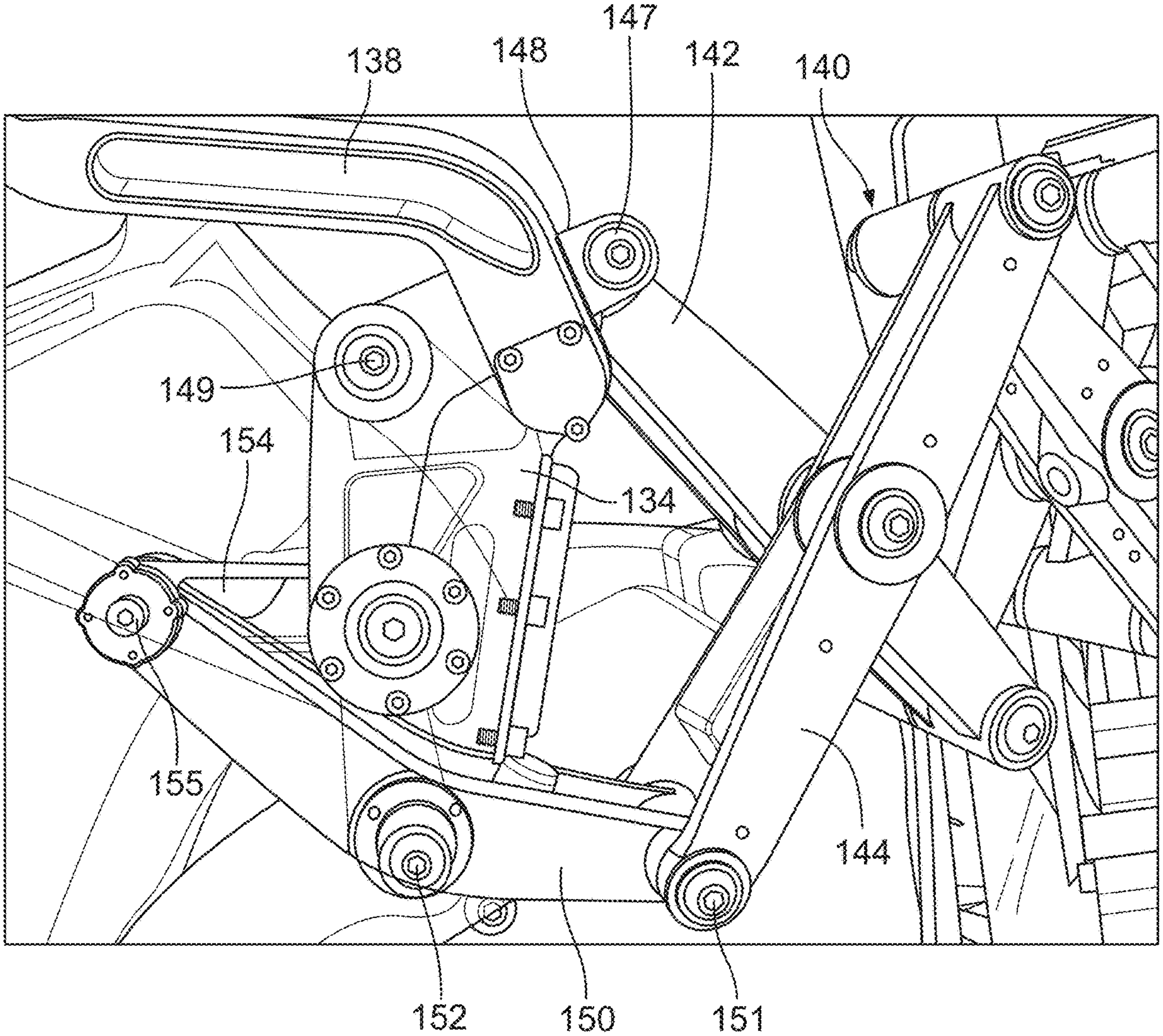
FIG. 10A and FIG. 10B are diagrammatic representations of one embodiment of coupling a scissor mechanism to an abduction/adduction mechanism.
Figure 10B:
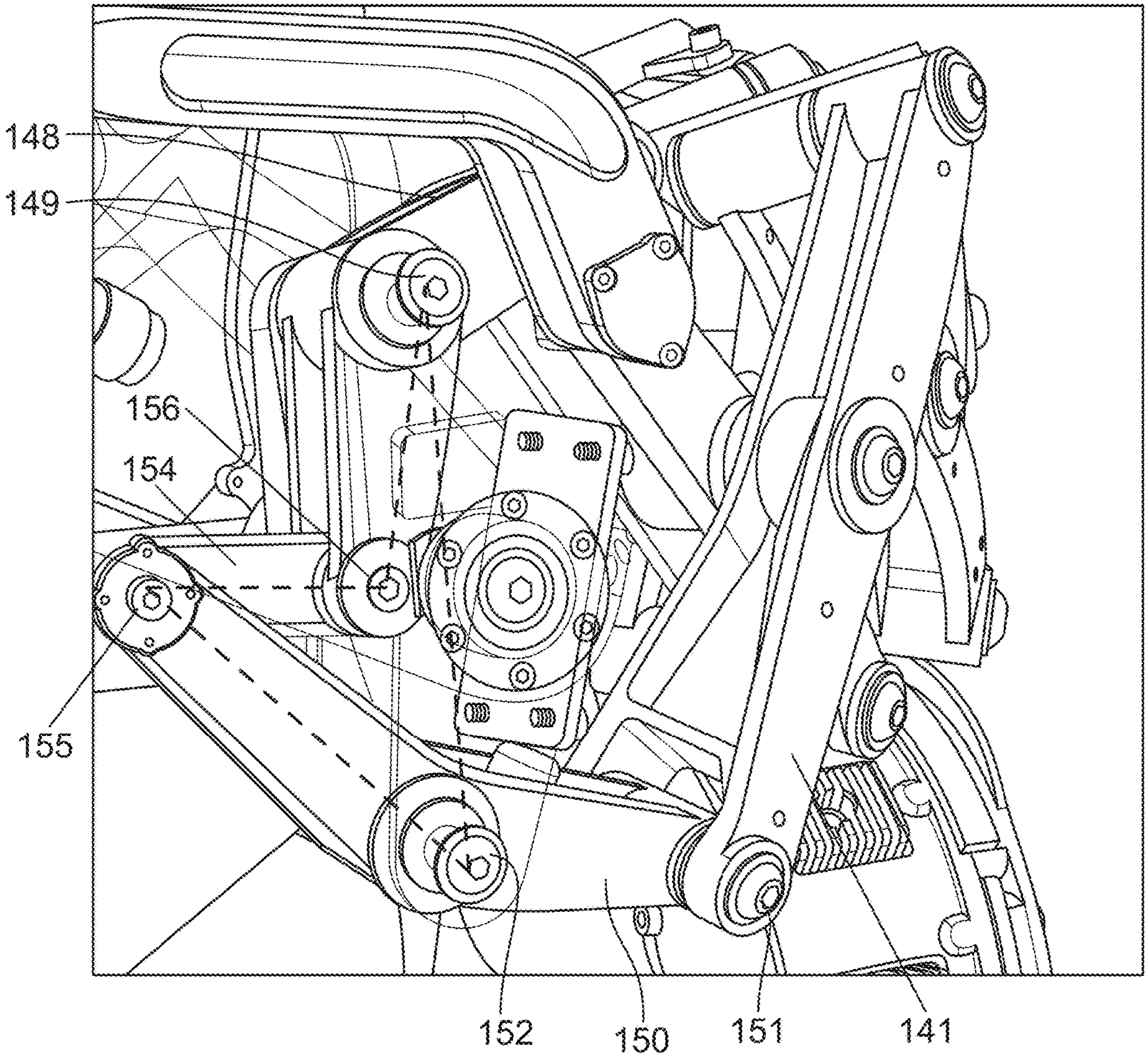

FIG. 10A and FIG. 10B are diagrammatic representations of one embodiment of coupling scissor mechanism 140 to the abduction/adduction mechanism. In the embodiment illustrated, the scissor links are coupled to the abduction/adduction mechanism by an intermediate linkage. Coupling between scissor links can be achieved in other ways such as, but not limited to, using other types of linkages or through gearing.

With reference to FIG. 10A, a first scissor link 141 is coupled to member 148 at revolute joint 147. Member 148 is coupled to member 134 at revolute joint 149 (member 134 is transparent in FIG. 10A and FIG. 10B). Similarly, a second scissor link 141 is coupled to member 150 at revolute joint 151 and member 150 is coupled to member 134 at revolute joint 152. The portion of member 148 between revolute joints 147 and 149 and the portion of member 150 between revolute joints 151 and 152 may be considered end scissor links. An intermediate linkage may be provided between the scissor links and the hip abduction/adduction linkage. To this end, member 150 is coupled to member 154 at revolute joint 155 and member 148 is coupled to member 154 at revolute joint 156 (FIG. 101B). As shown by the dashed lines in FIG. 10B, this arrangement creates a four-bar linkage coupling the scissor links, where the four-bar linkage is formed by the portion of member 148 between joint 149 and joint 156 (first bar), member 154 running from joint 156 to joint 155 (second bar), the portion of member 150 running from joint 152 to joint 155 (third bar), and the span of member 134 between joint 149 and joint 152 acting as the ground (fourth bar) for the four-bar linkage. A four-bar mechanism may also be used at the distal end of scissor mechanism 140. The four-bar linkage mechanisms at the ends of scissor mechanism 140 allow scissor mechanism to be extended or contracted without requiring some mechanism to move 3-body pin joints at the ends of the scissor mechanism. This can allow scissor mechanism 140 to be passive and follow the wearer's internal/external rotation DOF. Moreover, the abduction/adduction linkage can be actuated without causing scissor mechanism 140 to extend/contract.

Figure 11:
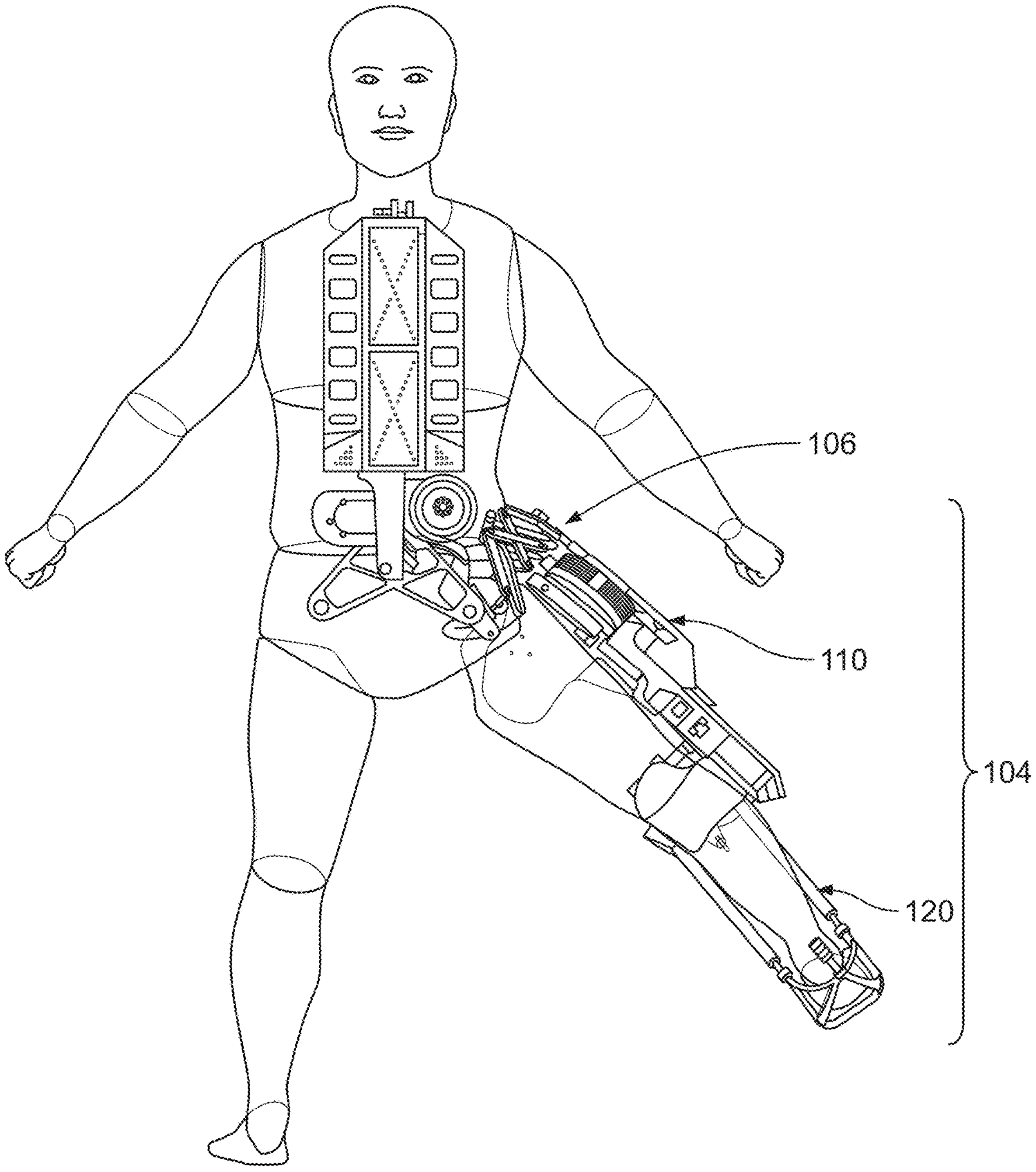
FIG. 11 is diagrammatic representation of a rear view of a wearer and one embodiment of a portion of an exoskeleton with a leg assembly abducted.

FIG. 11 is a diagrammatic representation of one embodiment of a portion of one embodiment of exoskeleton 100 on a wearer. In this example, hip joint mechanism 106 has actuated to abduct the leg assembly 104 with the wearer's leg. It can be noted that, in some embodiments, abduction/adduction at the hip does not expand or contract the scissor mechanism 140.

Figure 12:
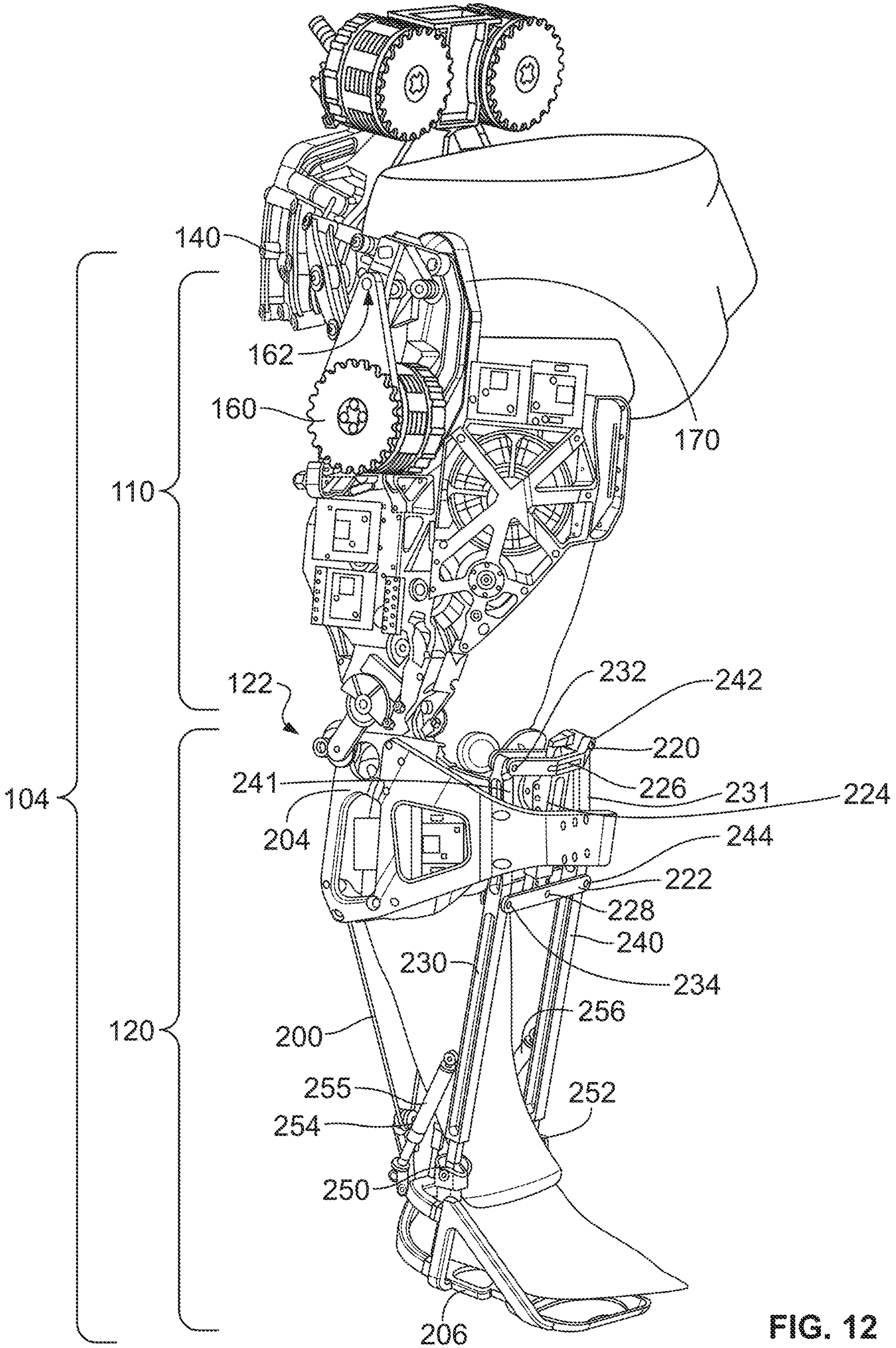
FIG. 12 is a diagrammatic representation of one embodiment of a leg assembly.

Turning now to FIG. 12, one embodiment of leg assembly 104 is illustrated. As discussed previously, leg assembly 104 includes upper leg subassembly 110 and lower leg subassembly 120. Upper leg subassembly 110 and lower leg subassembly 120 include a plurality of structural elements that provide structural support for the exoskeleton. Various control circuitry (e.g., PCB boards for respective motors and other circuitry) may be mounted to the structural elements. Upper leg subassembly 110 and lower leg subassembly 120 are coupled at a knee joint 122. According to one embodiment, knee joint 122 is a compound pulley rolling joint.

A second end of scissor mechanism 140 is coupled to upper leg subassembly 110. In some embodiments, the second end of scissor mechanism 140 is connected to upper leg subassembly 110 by a coupling linkage, gearing or other mechanism. More particularly, in some embodiments the end scissor links are coupled to upper leg subassembly 110 using a four-bar linkage, which may be similar to the four-bar linkage discussed above in conjunction with FIG. 10A and FIG. 10B or may be another type of four-bar linkage or other linkage.

Upper leg subassembly 110 includes a flexion/extension mechanism for the exoskeleton's hip joint. More particularly, upper leg subassembly 110 includes a hip flexion/extension joint 160 that defines a hip flexion/extension axis of rotation—for example, a hip transverse axis—about which upper leg subassembly 110 can rotate to flex/extend the leg assembly 104 at the hip joint (raise/lower the thigh to the front of the user or extend the thigh behind user). Upper leg subassembly 110 includes a flexion/extension actuator 162 to induce rotation at hip flexion/extension joint 160 to flex/extend the leg assembly 104. In one embodiment, flexion/extension actuator 162 is a series elastic actuator. Flexion/extension actuator 162 may be positioned away from hip flexion/extension joint 160. This helps reduce bulk at the joint.

Figure 13A:
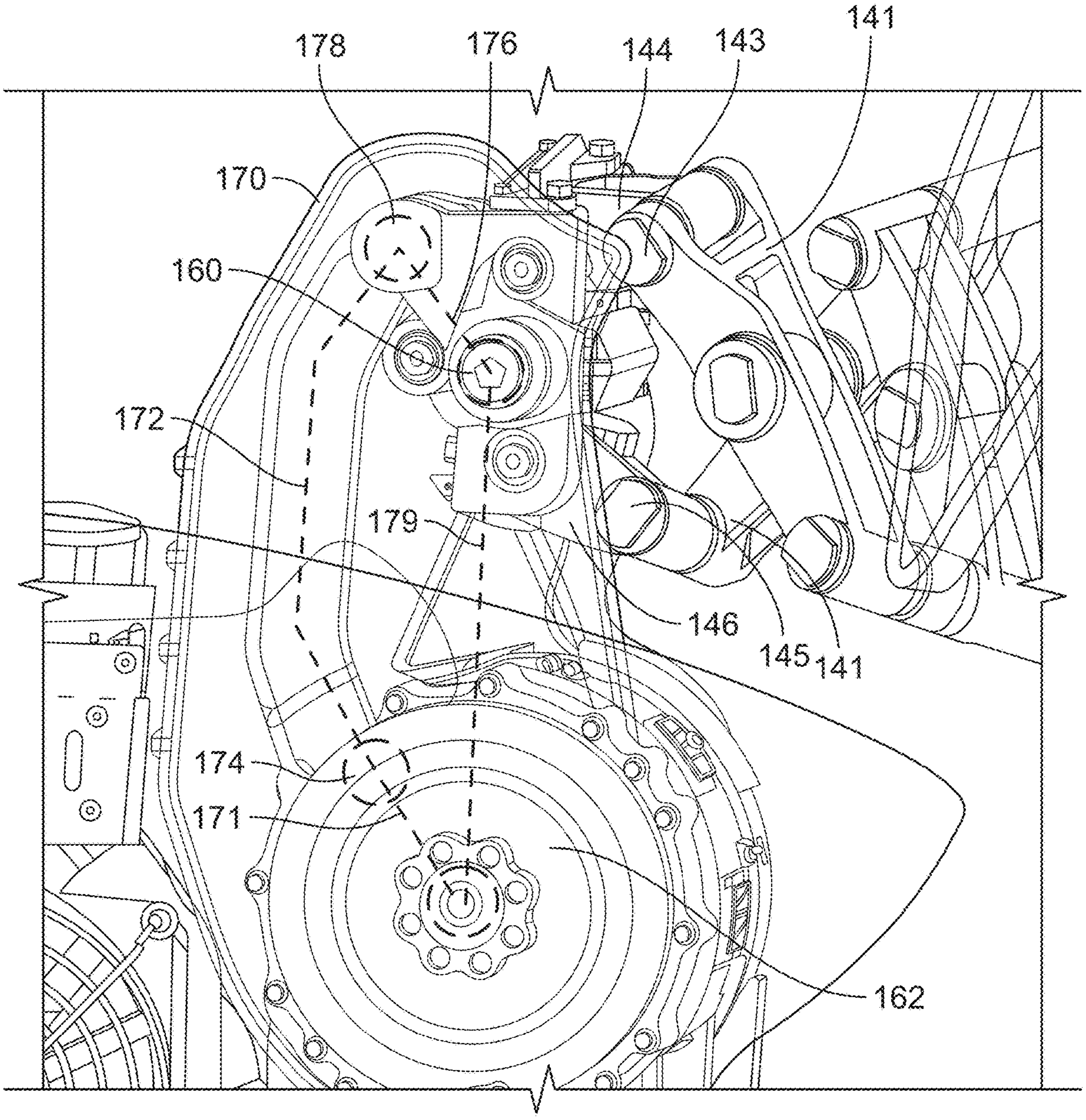
FIG. 13A is a diagrammatic representation of a view from the inner side (wearer side) of one embodiment of an upper leg subassembly illustrating an example hip flexion/extension linkage.

With reference to FIG. 13A, a view from the inner side (wearer side) of upper leg subassembly 110 with certain features, such as support structure 170, made transparent is provided. According to one embodiment, flexion/extension actuator 162 is coupled to hip flexion/extension joint 160 by a flexion/extension four-bar linkage (the four-bar linkage is represented by dashed lines in FIG. 13A). The flexion/extension four-bar linkage comprises an output member 171 coupled to the output of flexion/extension actuator 162. Output member 171 is coupled at revolute joint 174 to second member 172, which provides a second bar of the four-bar linkage. Second member 172 is coupled at revolute joint 178 to a third member 176, which provides a third bar of the four-bar linkage. The third member 176 is coupled to and rotatable about hip flexion/extension joint 160. As mentioned, flexion/extension actuator 162 and hip flexion/extension joint 160 are in fixed positions relative to a support structure 170 which spans between them. Thus, the support structure 170 provides a mechanical ground and acts as a fourth bar 179 for the four-bar linkage. This arrangement creates a parallelogram four-bar linkage, with the support structure 170 between hip flexion/extension joint 160 and flexion/extension actuator 162 providing a ground member of the four-bar linkage.

Flexion/extension actuator 162 rotates output member 171, which drives member 172. Member 172 pushes/pulls member 176. Because member 176 is fixed relative to the mechanical ground and rotatable about joint 160, the entire upper leg subassembly 110 rotates about hip flexion/extension joint 160.

Figure 13B:
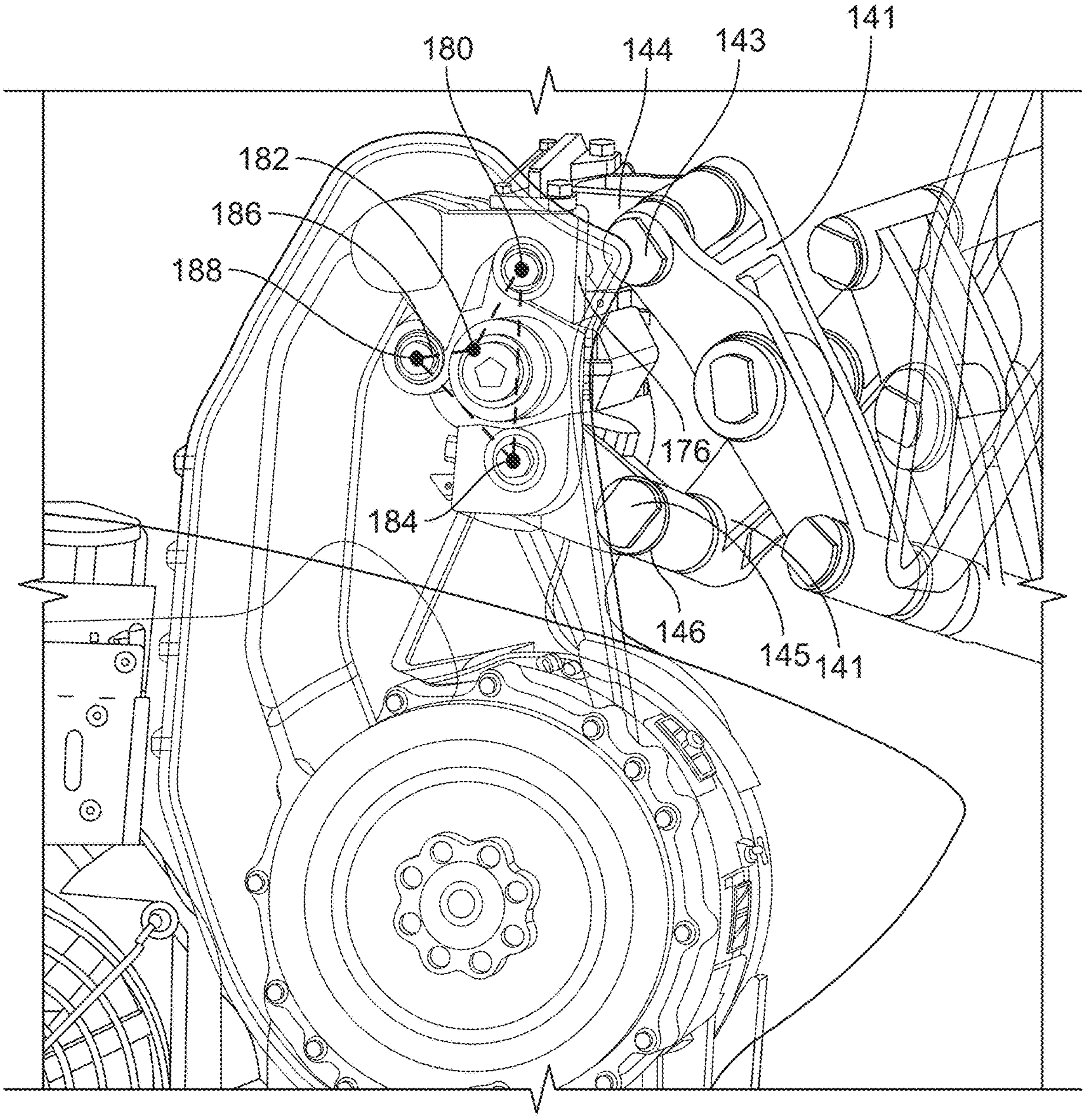
FIG. 13B is a diagrammatic representation of a view from the inner side (wearer side) of one embodiment of an upper leg subassembly illustrating one example of an intermediate linkage.

With reference to FIG. 13B, this figure illustrates an intermediate linkage (represented in dashed lines) between the scissor mechanism 140 and the hip flexion/extension linkage, a first scissor link 141 is coupled to member 144 at revolute joint 143. Member 144 is coupled to member 176 at revolute joint 180. Similarly, a second scissor link 141 is coupled to member 146 at revolute joint 145 and member 146 is coupled to member 176 at revolute joint 184. The portion of member 146 between revolute joints 143, 180 and the portion of member 146 between revolute joints 145, 184 may be considered end scissor links. An intermediate linkage may be provided between the scissor links. To this end, member 146 is coupled to member 186 (obscured) at revolute joint 188 and member 144 is coupled to member 186 at revolute joint 182. As shown by the dashed lines in FIG. 13B, this arrangement creates a four-bar linkage coupling the scissor links, where the four-bar linkage is formed by the portion of member 144 between joint 180 and joint 182 (first bar), member 186 running from joint 182 to joint 184 (second bar), the portion of member 146 running from joint 184 to joint 188 (third bar), and the span of member 176 between joint 180 and joint 184 acting as the ground (fourth bar) for the four-bar linkage. The four-bar mechanisms at the end of the scissor mechanism 140 allow scissor mechanism 140 to be extended or contracted without requiring some mechanism to move 3-body pin joints. Moreover, the hip flexion/extension linkage can be actuated without expanding/contracting the scissor mechanism 140.

Thus, some embodiments include a hip joint assembly that connects the leg assembly to the torso portion of the exoskeleton. The hip joint assembly comprise a hip abduction/adduction joint defining a hip abduction/adduction axis of rotation, a hip flexion/extension joint defining a hip flexions/extension axis of rotation, a hip abduction/adduction actuator to drive abduction/adduction of the leg assembly about the hip abduction/adduction axis of rotation and a hip flexion/extension actuator to drive flexion and extension of the leg assembly about the hip flexion/extension axis of rotation. The hip abduction/adduction actuator may be remote from the hip abduction/adduction axis of rotation. The hip flexion/extension actuator may be remote from hip flexion/extension axis of rotation. In some embodiments, a portion of the hip joint assembly may reside in the leg assembly (for example, the flexion/extension joint or the hip flexion/extension actuator).

Some embodiments of the hip joint assembly comprise a hip internal/external rotation mechanism coupled to the hip abduction/adduction joint and the hip flexion/extension joint. The hip internal/external rotation mechanism may be rotatable about the hip abduction/adduction axis of rotation to abduct/adduct the leg assembly. The hip internal/external rotation mechanism may have an internal/external rotation degree of freedom, which may be passive in some embodiments.

Figure 14A:
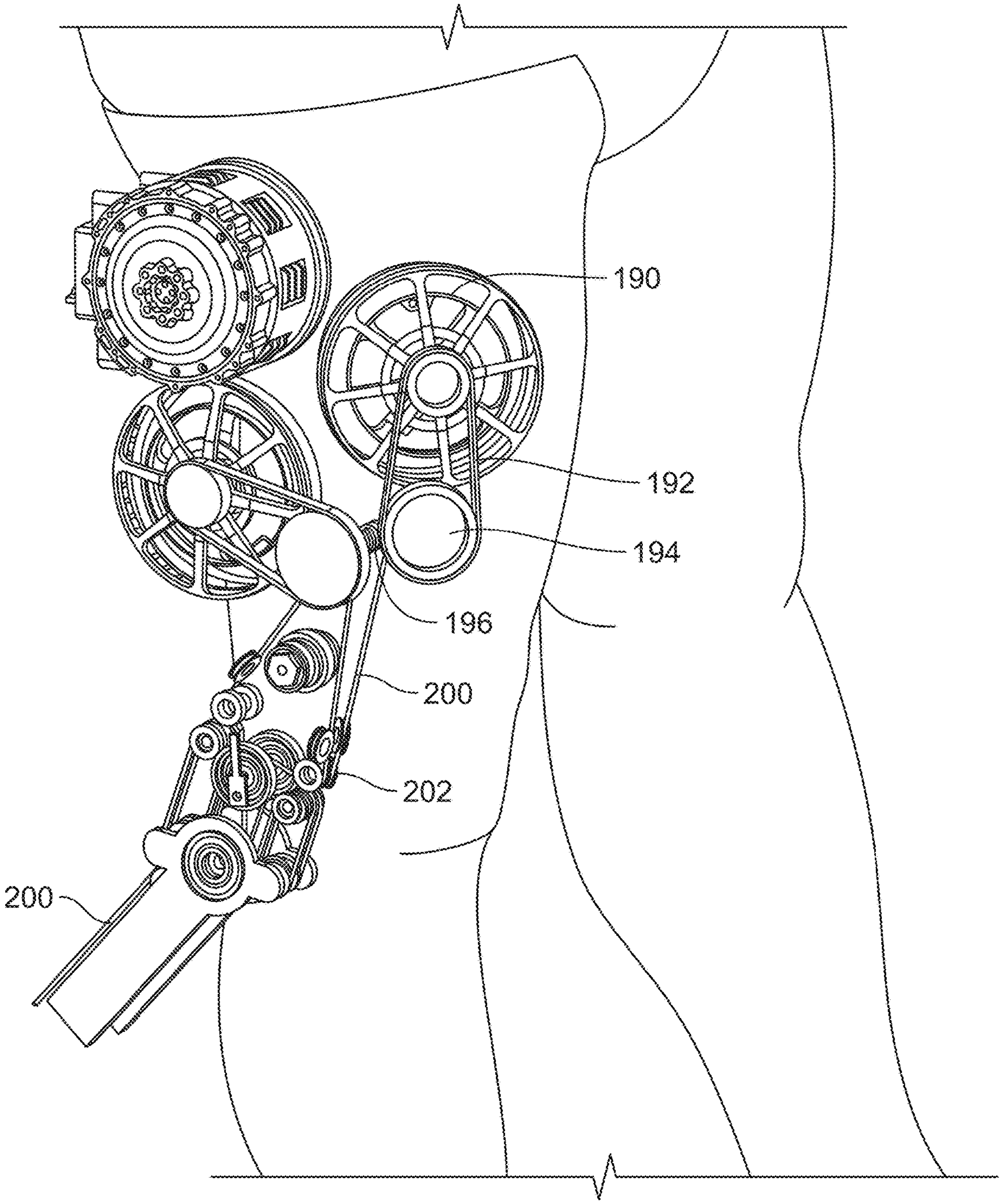
FIG. 14A is a diagrammatic representation of one embodiment of an upper leg subassembly and upper portion of a lower leg subassembly with various features removed for better viewing and FIG. 14B is a diagrammatic representation another view of one embodiment of an upper leg subassembly and upper portion of a lower leg subassembly with various features removed for better viewing according to one embodiment.
Figure 14B:
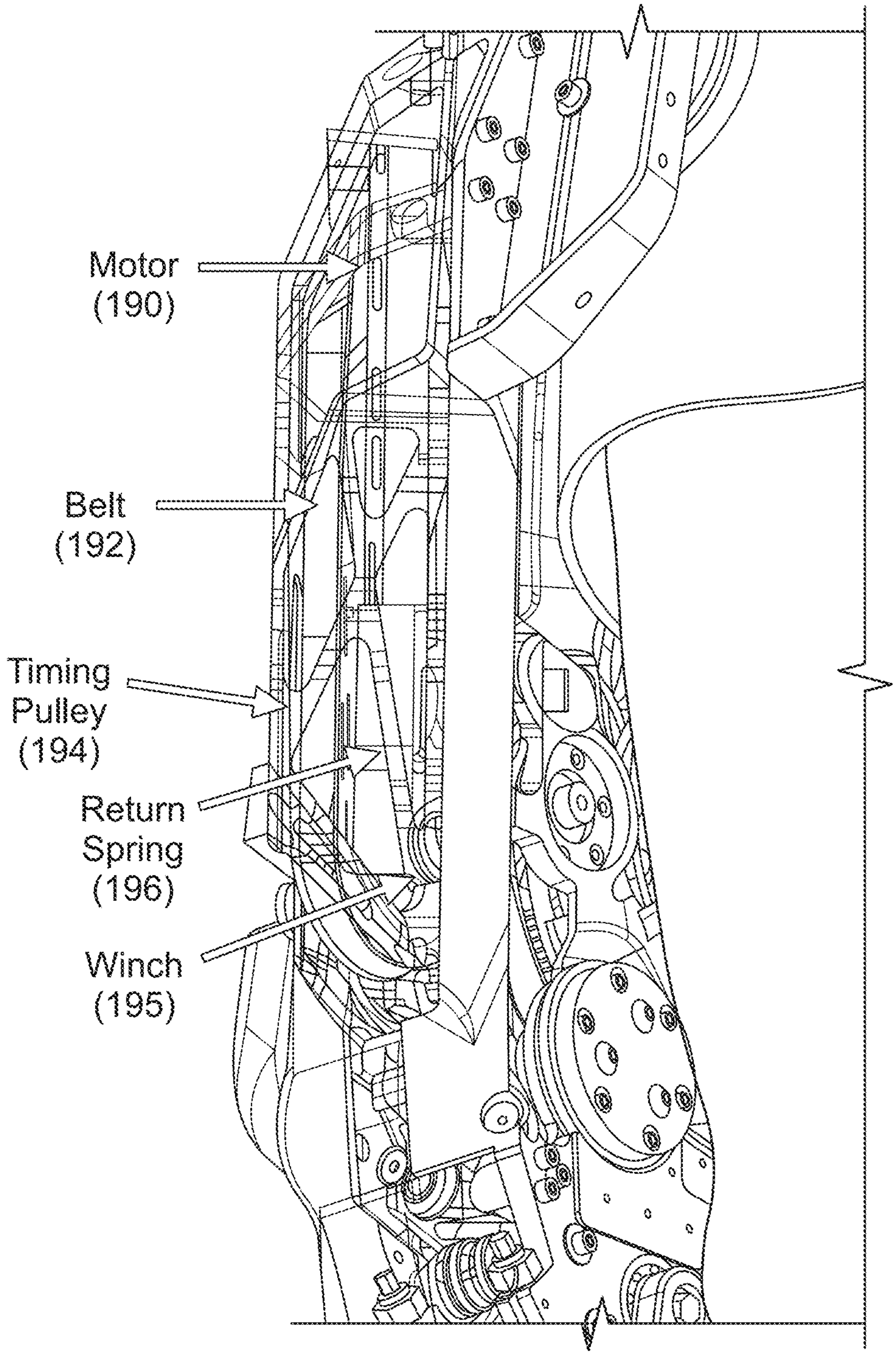

FIG. 14A and FIG. 14B are diagrammatic representations of one embodiment of upper leg subassembly 110 and the upper portion of one embodiment of lower leg subassembly 120 with various features removed for better viewing. In particular, FIGS. 14A and 14B illustrate that the ankle actuation motor, gearing, tensioners, etc. may be conveniently located on the upper leg subassembly 110, allowing the mass of those items to be kept further away from the extremities than if mounted to lower leg subassembly 120.

In the illustrated embodiment, upper leg subassembly 110 includes an ankle motor 190 that drives a belt 192 to turn a timing pulley 194 and a winch 195 (behind timing pulley 194). Depending on the direction of rotation, the winch takes in or lets out an ankle actuation cable 200. Actuation cable 200 is routed by a set of guide pulleys (guide pulley 202 is indicated) through a knee joint and down to the angle. According to one embodiment, the knee joint is a compound pulley rolling joint. The cables can be routed in a generally "S" pattern around the centers of rolling for the rolling joint. As will be appreciated, ankle actuation cable 200 may be routed through the compound pulley knee joint in a manner that prevents the length of the cable for changing as the joint bends. One embodiment of a routing cables through a compound pulley joint in a manner that prevents the length of the cable for changing as the joint bends is described in United States Patent Publication No. 2018/0065243, entitled "Robot Arm," to Kim et al., which is hereby fully incorporated by reference herein for all purposes.

In some embodiments, a return spring mechanism 196, such as a coil spring or other torsion spring, is provided to keep nominal tension on cable 200 even when the system is off. For example, a constant force coil spring may be connected to winch 195 to act on the winch 195 in the same direction as the motor to take in ankle actuation cable 200. This can prevent cable 200 from losing tension and falling off of the guide pulleys in leg assembly 104.

Returning to FIG. 12 and turning now to lower leg subassembly 120, this subassembly includes an upper portion 204 that comprises part of the compound pulley rolling joint for the knee. Lower leg subassembly 120 further includes a footbed 206 coupled to the upper portion 204 by an ankle joint mechanism that incorporates 3-DOFs. In particular, lower leg subassembly 120 includes mechanisms to allow actuation of ankle flexion, while also allowing roll and yaw.

The ankle joint mechanism comprises a remote parallelogram structure comprising first and second parallel members 220, 222 that span across the midline of the shin and parallel members 231 and 241 that span between the ends of members 220, 222 to form a parallelogram. In the illustrated embodiments, parallel members 231 and 241 are the upper end portions of parallel members 230, 240 which extend to the footbed 206. Parallel members 220, 222 are coupled to a support structure 224 by spherical joints 226, 228, respectively. Generally, support structure 224 is a structure that remains in place relative to the wearer's leg when the exoskeleton is worn. According to one embodiment, spherical joints 226, 228 are aligned with the midline of the shin, the midline of the footbed 206 or are otherwise positioned to align with the midline of the wearer's ankle.

The first end of member 220 and the first end of member 222 couple to member 231 at pin joints 232, 234 respectively, and the second end of member 220 and the second end of member 222 couple to member 241 at pin joints 242, 244 respectively, to form a remote parallelogram. Member 230 extends down from the remote parallelogram and couples to the footbed at spherical joint 250. Member 240 extends down from the remote parallelogram, parallel to member 230, and couples to the footbed at a similar spherical joint 252. Spherical joints 250, 252 can provide an ankle joint that allows flexion/extension of the foot. Spherical joints 250, 252 may also allow other movements.

Using the orientation illustrated in FIG. 12, rotation of members 220, 220 about the vertical axis common to spherical joints 226, 228 allows for yaw (that is, allows the wearer to twist their toes in or out). Rotation of member 220 about a horizontal axis of spherical joint 226 and rotation of member 222 about a horizontal axis of spherical joint 228, coupled with rotation relative to members 230, 240 allows for foot inversion/eversion.

Moving members 230, 240 on each side of the leg transmits load from the knee down to the footbed 206. In some embodiments, the ankle mechanism incorporates spherical joints 226, 228, 250, 252 to achieve the 3 degrees of freedom. Such a mechanism allows for very good kinematic alignment and ankle range of motion while remaining low profile and transmitting loads from the upper leg to the ground.

Flexion/extension can be achieved through the footbed 206 rotating relative to members 230, 240 at the respective spherical joints (e.g., spherical joints 250, 252). Ankle plantar flexion is actuated by cable 200 that runs to a pulley 254 that is coupled to the rear of the footbed. The other end of the ankle actuation cable 200 can be terminated at any suitable location on the lower leg assembly.

As cable 200 shortens, the back of the footbed 206 is pulled up to tilt the toe down. Biasing members, such as springs 255, 256 may be provided to bias the back of the footbed down as cable 200 lengthens—for example, as cable 200 is let out from winch 195 of the upper leg subassembly 110).

Figure 15:
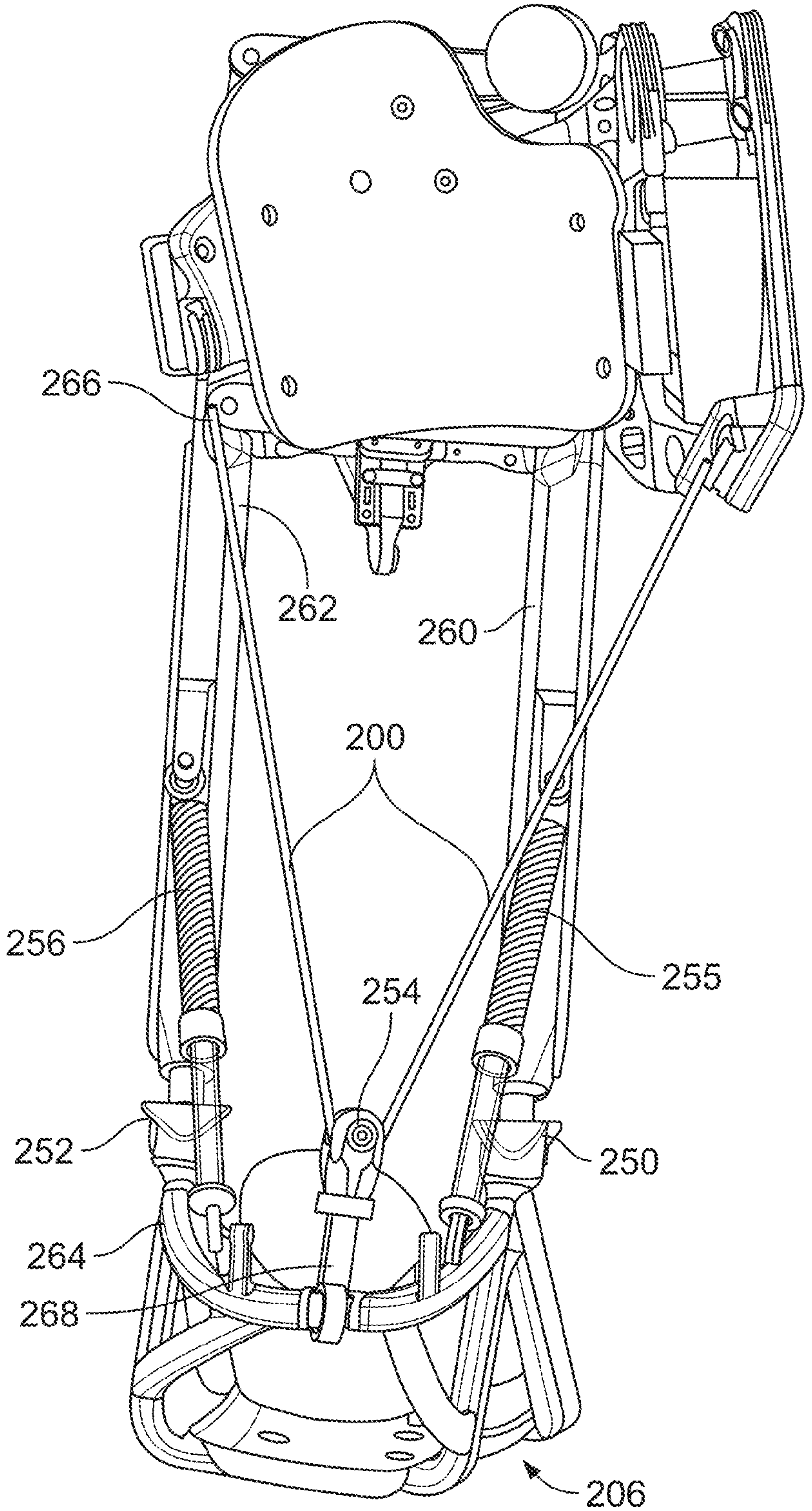
FIG. 15 is a diagrammatic representation of a rear view of one embodiment of an ankle actuation mechanism and a footbed.
Figure 16:
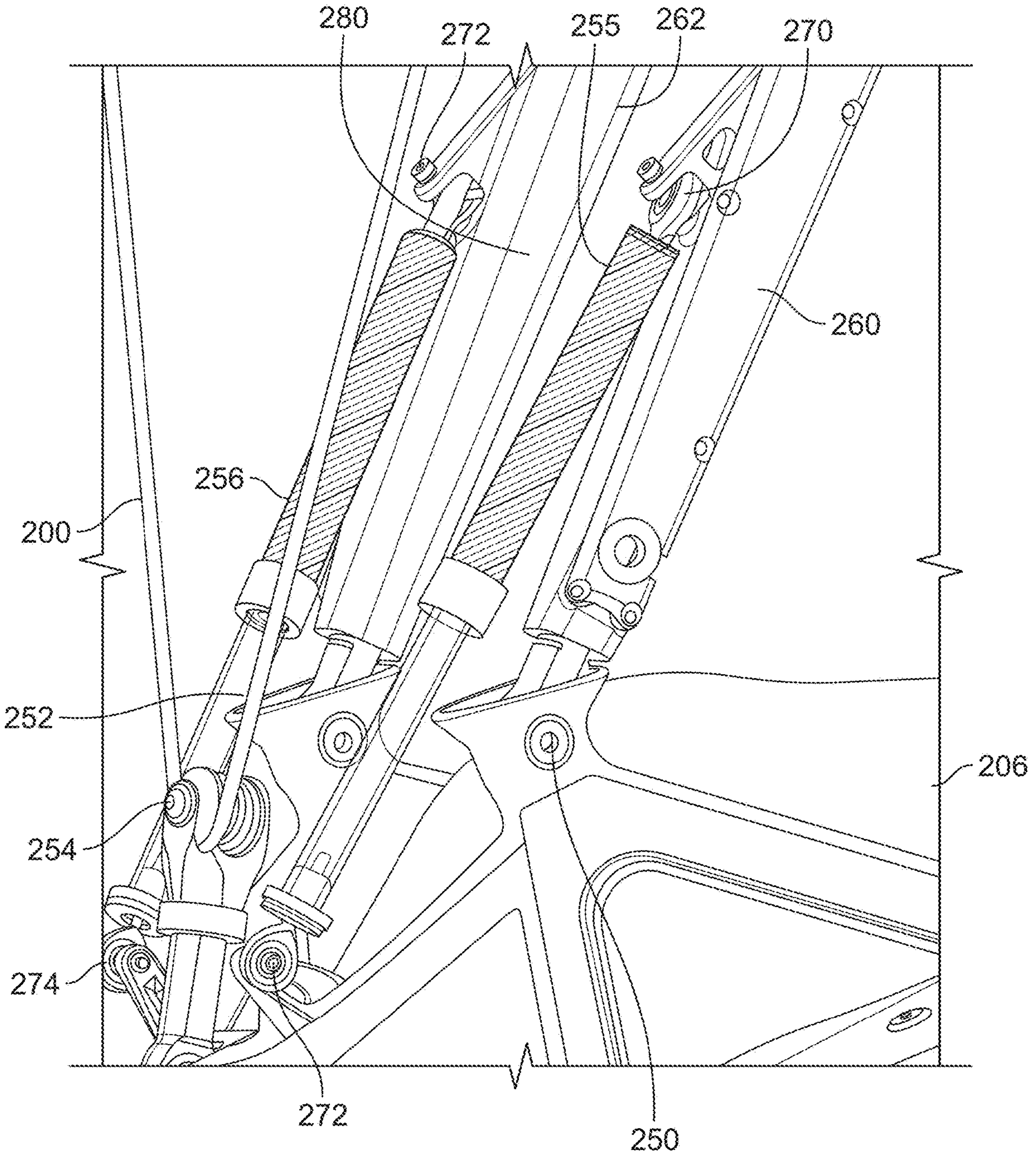
FIG. 16 is a diagrammatic representation of an oblique rear view of one embodiment of a portion of footbed 206 and an ankle actuation mechanism.

FIG. 15 is a diagrammatic representation of a rear view of one embodiment of an ankle actuation mechanism and a footbed 206. The ankle actuation mechanism of FIG. 15 is similar to that of FIG. 12, but illustrates parallel members 260, 262, which are example alternative embodiments of members 230, 240 of FIG. 12. FIG. 16 is a diagrammatic representation of an oblique rear view of one embodiment of a portion of footbed 206 and an ankle actuation mechanism. FIG. 16 is a diagrammatic representation of an oblique rear view of one embodiment of a portion of footbed 206 and an ankle actuation mechanism and FIG. 18 is diagrammatic representation of a view of one embodiment of another portion of footbed 206 and an ankle actuation mechanism, including a cross-section of an ankle pulley assembly.

In the embodiment of FIG. 15, members 260, 262 extend from a remote parallelogram (for example, as illustrated in FIG. 12) to footbed 206. Members 260, 262 are coupled to footbed 206, and more particularly to the top of heel cage 264, at respective spherical joints 250, 252. Springs 255, 256 are coupled between the members 260, 262 respectively and the heel cage 264 and act to push the rear of the footbed 206 down. An ankle pulley assembly 266 comprising ankle actuation cable pulley 254 is also coupled to heal cage 264 at a respective joint. Ankle actuation cable 200 may be routed from the upper leg assembly to the ankle actuation mechanism. Guide pulleys or other routing mechanisms are used to route ankle actuation cable 200 to ankle actuation cable pulley 254. According to one embodiment, the end 268 of ankle actuation cable 200 is terminated at any suitable location on the lower leg assembly.

With reference to FIG. 16, the first ends of springs 255, 256 connect to members 260, 262 at joints 270, 272 and the second ends of springs 255, 256 connect to footbed 206—and more particularly, to the heel cage 264, in the illustrated embodiment—at joints 272, 274. FIG. 16 further illustrates ankle actuation cable 200 routed through ankle actuation cable pulley 254.

Figure 17:
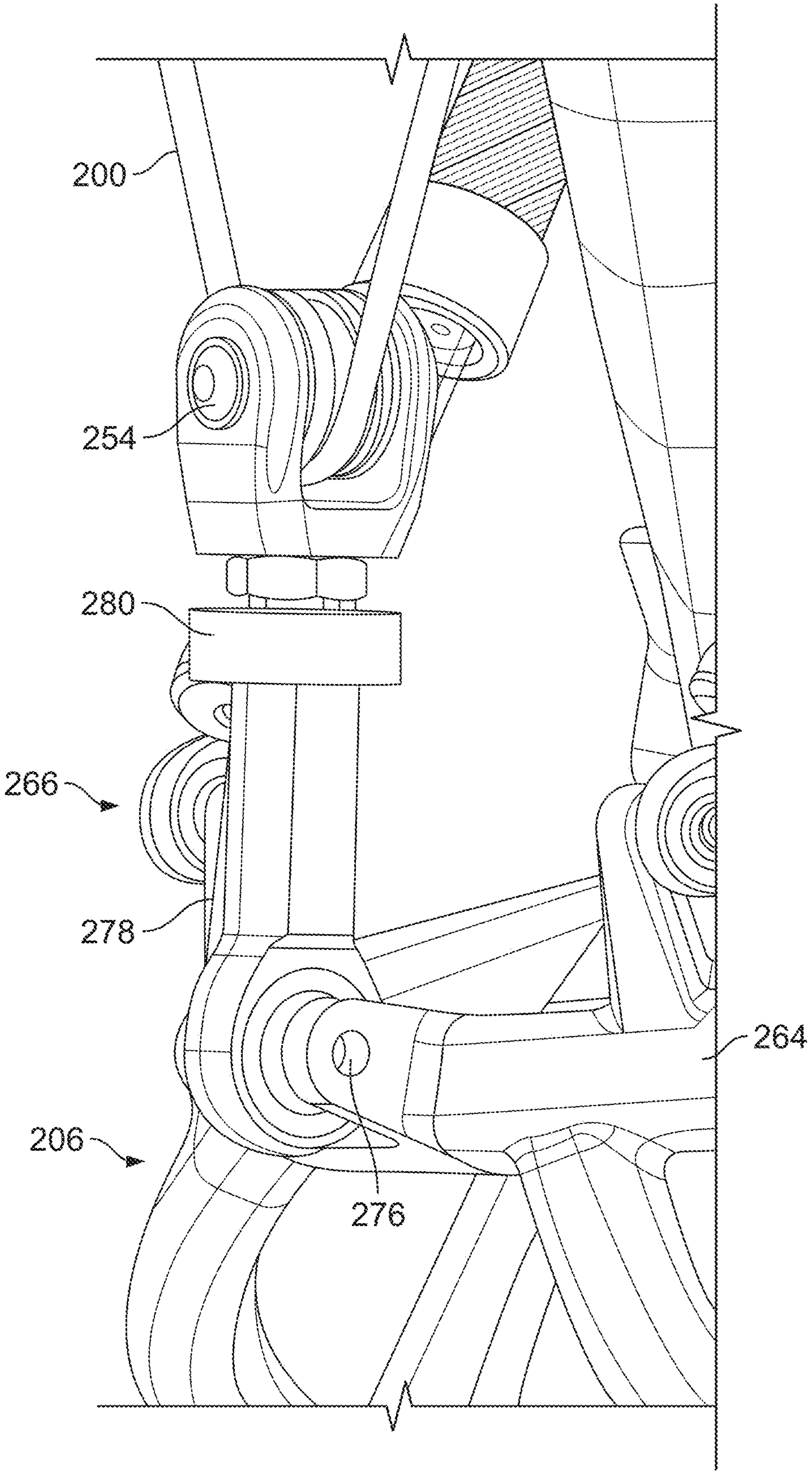
FIG. 17 is a diagrammatic representation of an oblique rear view of one embodiment of a portion of a footbed and an ankle actuation mechanism.
Figure 18:
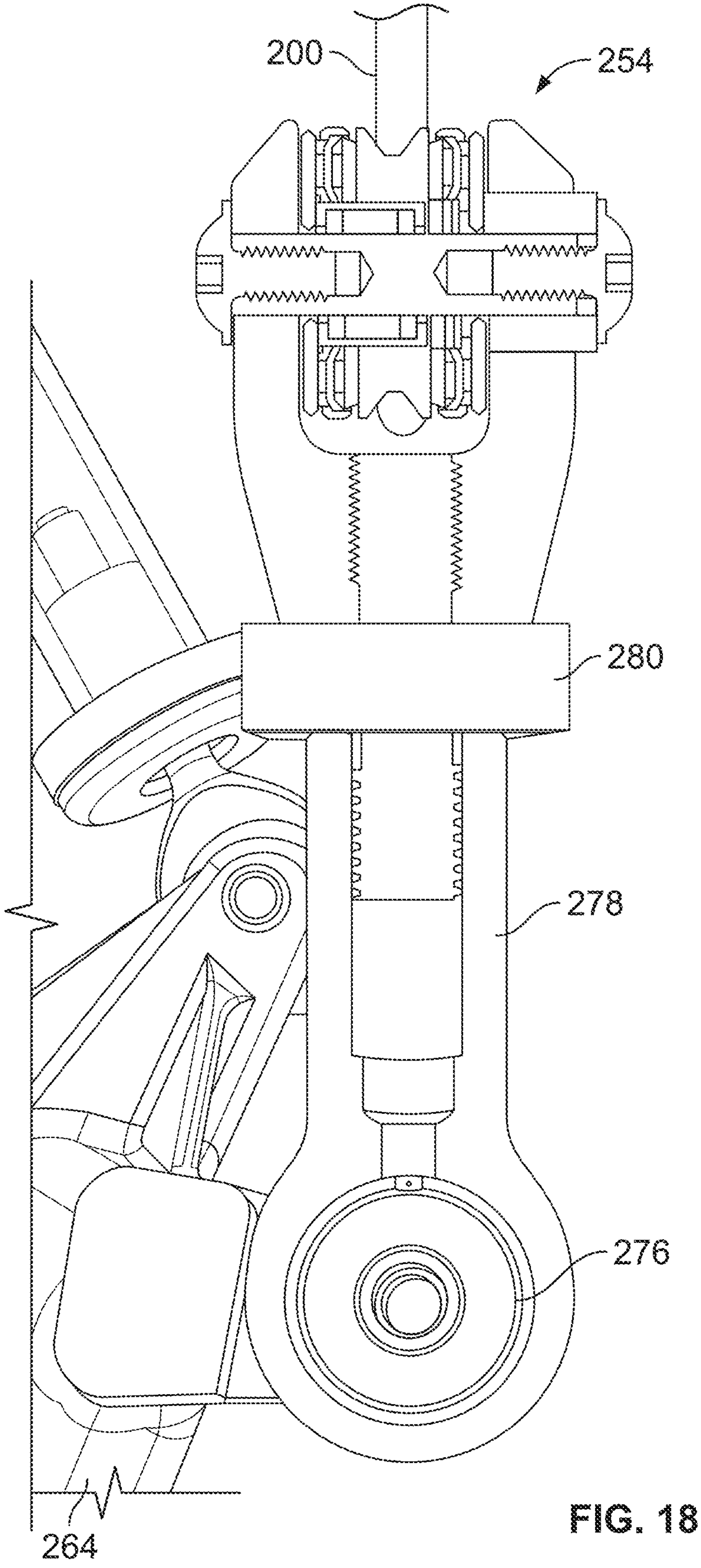
FIG. 18 is diagrammatic representation of a view of one embodiment of another portion of one embodiment of a footbed and an ankle actuation mechanism, including a cross-section of an ankle pulley assembly.

Turning to FIG. 17 and FIG. 18, a load sensor 280 may be disposed to sense a load indicative of the tension in cable 200. For example, in the illustrated embodiment, an ankle pulley assembly 266 includes load sensor 280. Ankle pulley assembly is coupled to heel cage 264 of footbed 206 at a joint 276 that allows the ankle pulley assembly 266 to rotate (e.g., about a transverse axis) relative to footbed 206. Ankle pulley assembly 266 comprises a structure 278 (e.g., an elongate member, such as a bar or other type of support structure) coupled to footbed 206 at joint 276, a load sensor 280 mounted to the structure 278 and ankle actuation cable pulley 254 mounted to the load sensor. Load sensor 280 senses the load applied by cable pulley 254, which is indicative of the tension in cable 200.

Figure 19:
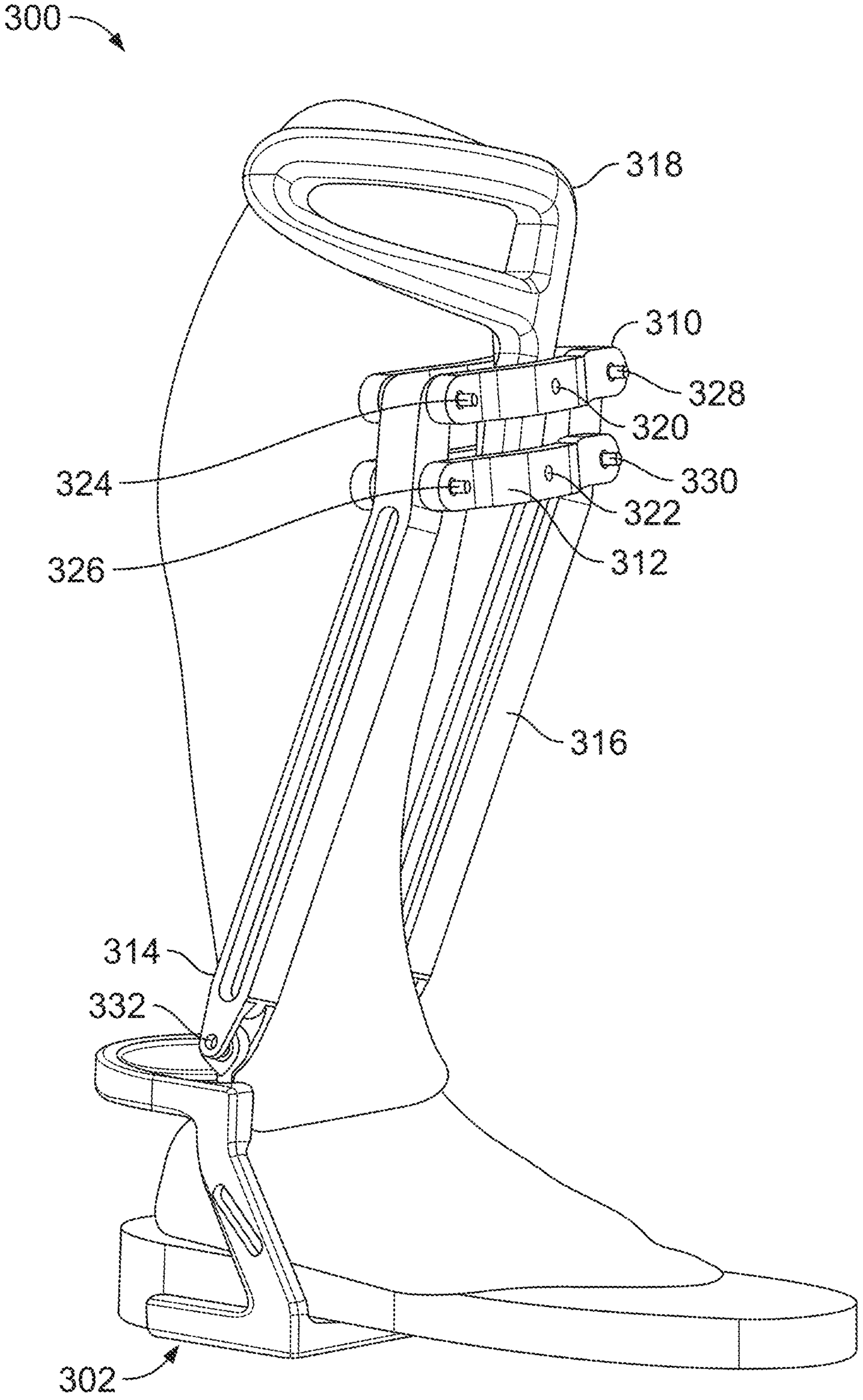
FIG. 19 is a diagrammatic representation of one embodiment of an ankle actuation mechanism and a footbed.

FIG. 19 is a diagrammatic representation of another embodiment of an ankle joint mechanism 300 coupled to a footbed 302. The ankle joint mechanism comprises a remote parallelogram structure comprising first and second parallel members 310, 312 that span across the midline of the shin and parallel members 314 and 316 that span between the ends of members 310, 312 to form a parallelogram. Parallel members 310, 312 are coupled to a support structure 318 by spherical joints 320, 322, respectively. Generally, support structure 318 is a structure that remains in place relative to the wearer's leg when the exoskeleton is worn. According to one embodiment, spherical joints 320, 322 are aligned with the midline of the shin, the midline of the footbed 302 or are otherwise positioned to align with the midline of the wearer's ankle.

The first end of member 310 and the first end of member 312 couple to member 314 at pin joints 324, 326 respectively, and the second end of member 310 and the second end of member 312 couple to member 316 at pin joints 328, 330 respectively, to form a remote parallelogram. Member 314 extends down from the remote parallelogram and couples to the footbed at spherical joint 332. Member 316 extends down from the remote parallelogram, parallel to member 314, and couples to the footbed at a similar spherical joint (hidden from view in FIG. 15).

Using the orientation illustrated in FIG. 19, rotation of members 310, 312 about the vertical axis common to spherical joints 320, 322 allows for yaw (that is, allows the wearer to twist their toes in or out). Rotation of member 310 about a horizontal axis of spherical joint 320 and rotation of member 312 about a horizontal axis of spherical joint 322, coupled with rotation relative to members 314, 316 allows for foot inversion/eversion.

Moving members 314, 316 on each side of the leg transmits load from the knee down to the footbed 302. In some embodiments, the mechanism incorporates spherical joints 320, 322, 332 and a spherical joint between member 316 and footbed 302 to achieve the three degrees of freedom. Such a mechanism allows for very good kinematic alignment and ankle range of motion while remaining low profile and transmitting loads from the upper leg to the ground.

Flexion/extension can be achieved through the footbed 302 rotating relative to members 314, 316 at the respective spherical joints (e.g., spherical joint 332 and corresponding spherical joint between member 316 and footbed 302). Ankle plantar flexion is actuated by a cable (e.g., ankle actuation cable 200) that runs to a pulley (not shown) that is coupled to the rear of the footbed. The other end of the ankle actuation cable can be terminated at any suitable location on the lower leg assembly.

As the cable shortens, the back of the footbed 302 is pulled up to tilt the toe down. Biasing members, such as springs may be provided to bias the back of the footbed 302 down as cable the ankle actuation cable.

Figure 20:
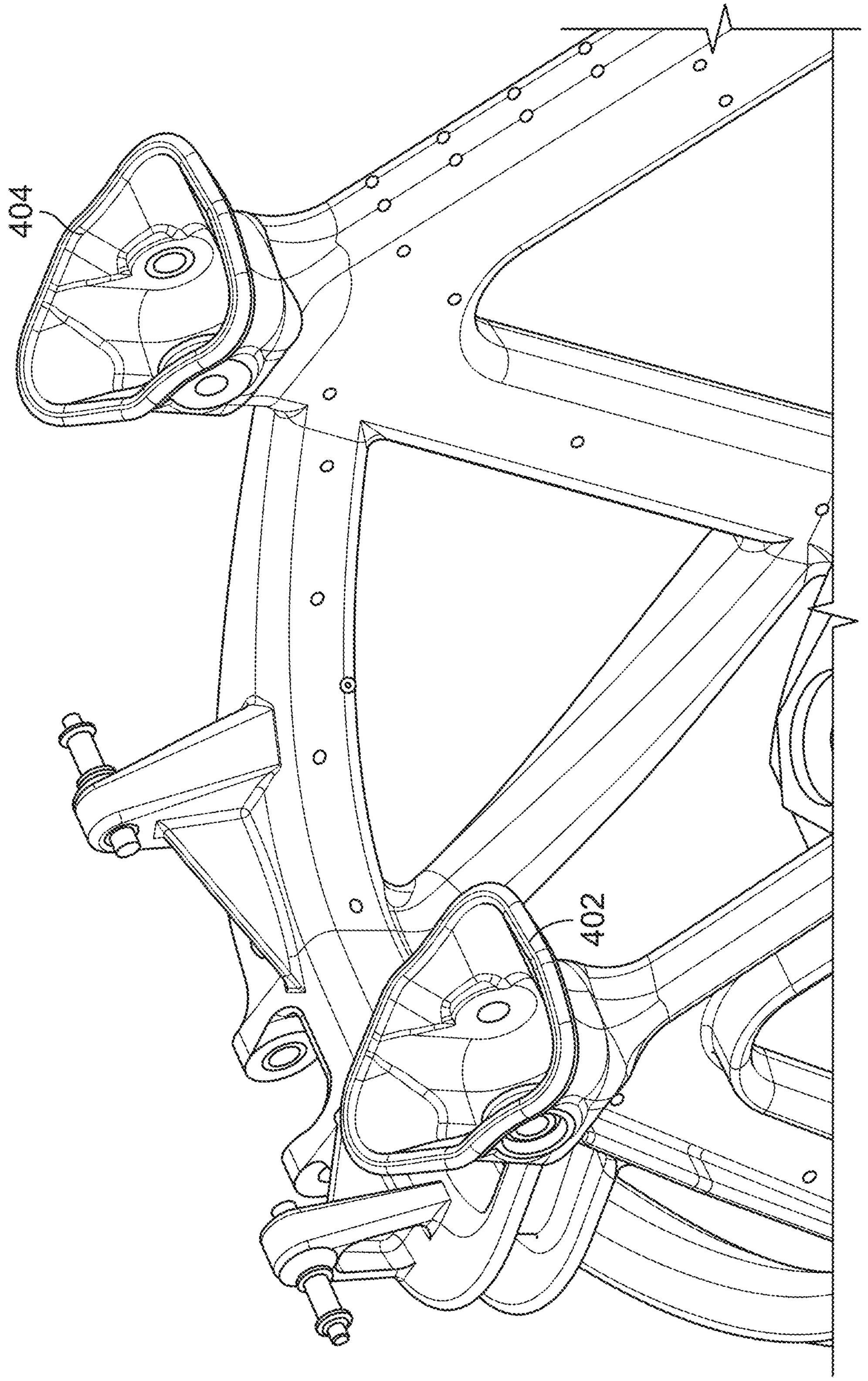
FIG. 20 is a diagrammatic representation of one embodiment of a footbed.

FIG. 20 illustrates a portion of one embodiment of a footbed 400. According to one embodiment, the spherical joints at which the members extending from the remote parallelogram (e.g., members 230, 240, 260, 262, 314, 316) connect to the footbed may be clevis-pin type joints that allow for multiple degrees of freedom. For example, spherical joint 250 or spherical joint 332 may be disposed in clevis 402 and the spherical joint 252 or the spherical joint for member 316 may be disposed in clevis 404. Clevis 402 and clevis 402 have an inner profile to limit the movement of the footbed relative to the downwardly extended parallel members (e.g., members 230, 240, 260, 262, 314, 316), thus restricting motion of the foot from achieving potentially unsafe positions. It can be noted that the rear portions of the clevis profiles are tapered. Consequently, as cable 200 is pulled up, the clevis profiles center the foot to prevent the foot from achieving a potentially unsafe position. Thus, the clevis profile may prevent a potentially unsafe position in which the foot is simultaneously at full extension and high roll or yaw.

It will be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only to those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Thus, while the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. An exoskeleton, comprising:
- a torso portion;
- a leg assembly, the leg assembly comprising:
  - a lower leg assembly comprising:
    - an ankle flexion/extension joint;
    - a footbed coupled to an ankle joint, the footbed having a rear portion behind the ankle joint, the ankle joint comprising a first spherical joint and a second spherical joint;
    - an ankle actuation cable adapted to lift the rear portion of the footbed;
    - a remote parallelogram structure coupled to the ankle joint, the remote parallelogram structure allowing for yaw of the footbed and inversion/eversion of the footbed;

a first parallel member running from the remote parallelogram structure to the first spherical joint; and a second parallel member running from the remote parallelogram structure to the second spherical joint; and an upper leg assembly coupled to the lower leg assembly at a knee joint, the upper leg assembly comprising an ankle actuation motor to take in and release the ankle actuation cable, wherein taking in the ankle actuation cable induces planter flexion of the footbed; and a hip joint assembly configured to connect the leg assembly to the torso portion, the hip joint assembly comprising a hip abduction/adduction joint comprising an actuator, the torso portion comprises a ground linkage of a four-bar linkage configured to connect the torso portion to the actuator of the hip abduction/adduction joint.

2. The exoskeleton of claim 1, wherein the hip joint assembly defines an active hip abduction/adduction degree of freedom and an active hip flexion/extension degree of freedom.

3. The exoskeleton of claim 2, wherein the hip joint assembly defines a passive hip internal/external rotation degree of freedom.

4. The exoskeleton of claim 1, wherein the hip joint assembly comprises:

the hip abduction/adduction joint defining a hip abduction/adduction axis;

a hip flexion/extension joint defining a hip flexion/extension axis;

a hip abduction/adduction actuator to drive abduction/adduction of the leg assembly about the hip abduction/adduction axis, the hip abduction/adduction actuator remote from the hip abduction/adduction axis; and a hip flexion/extension actuator to drive flexion and extension of the leg assembly about the hip flexion/extension axis, the hip flexion/extension actuator remote from the hip flexion/extension axis.

5. The exoskeleton of claim 4, wherein the hip joint assembly comprises:

a scissor linkage coupled to the leg assembly; and a hip abduction/adduction linkage coupled to the hip abduction/adduction joint, the scissor linkage and the hip abduction/adduction actuator, wherein the hip abduction/adduction actuator is adapted to drive the hip abduction/adduction linkage to induce abduction/adduction of the scissor linkage about the hip abduction/adduction axis to abduct/adduct the leg assembly.

6. The exoskeleton of claim 5, wherein the hip abduction/adduction actuator is placed to be above a wearer's hips during use and closer to a centerline of the exoskeleton than the hip abduction/adduction axis.

7. The exoskeleton of claim 5, wherein the hip abduction/adduction linkage is a first four-bar linkage.

8. The exoskeleton of claim 7, wherein the scissor linkage is coupled to the hip abduction/adduction linkage by an intermediate linkage.

9. The exoskeleton of claim 8, wherein the intermediate linkage comprises a second four-bar linkage.

10. The exoskeleton of claim 5, wherein the scissor linkage defines a hip internal/external rotation axis for the leg assembly.

11. The exoskeleton of claim 5, wherein the scissor linkage comprises a virtual center linkage.

12. The exoskeleton of claim 5, wherein the hip joint assembly comprises:

a hip flexion/extension linkage coupled to the hip flexion/extension joint, the scissor linkage, and the hip flexion/extension actuator, wherein the hip flexion/extension actuator is coupled to the leg assembly and adapted to drive the hip flexion/extension linkage to cause the leg assembly to flex/extend about the hip flexion/extension axis.

13. The exoskeleton of claim 12, wherein the hip flexion/extension linkage is a four-bar linkage.

14. The exoskeleton of claim 12, wherein the scissor linkage is coupled to the hip flexion/extension linkage by an intermediate linkage.

15. The exoskeleton of claim 14, wherein the intermediate linkage is a second four-bar linkage.

16. The exoskeleton of claim 12, wherein the scissor linkage is coupled to the hip abduction/adduction linkage by a first intermediate linkage and to the hip flexion/extension linkage by a second intermediate linkage, wherein the hip abduction/adduction linkage is a first four-bar linkage, the first intermediate linkage is a second four bar linkage, the hip flexion/extension linkage is a third four-bar linkage, and the second intermediate linkage is a fourth four-bar linkage.

17. The exoskeleton of claim 1, wherein the lower leg assembly comprises a support structure adapted to remain in place relative to a wearer's leg when the exoskeleton is worn and wherein the remote parallelogram structure comprises:

a first cross member coupled to the first parallel member, the second parallel member, and the support structure; and a second cross member parallel to the first cross member, the second cross member coupled to the first parallel member, the second parallel member, and the support structure.

18. The exoskeleton of claim 17, wherein the first cross member is coupled to the first parallel member at first pin joint, the support structure at a third spherical joint, and the second parallel member at a second pin joint and wherein the second cross member is coupled to the first parallel member at a third pin, the support structure at a fourth spherical joint and the second parallel member at a fourth pin joint.

19. The exoskeleton of claim 1, further comprising a biasing member coupled to the first parallel member and the footbed to bias the rear portion of the footbed down.

20. The exoskeleton of claim 1, wherein the footbed comprises a first clevis for the first spherical joint and a second clevis for the second spherical joint, wherein the first clevis and the second clevis have a tapered profile to limit a range of motion of the footbed.

21. The exoskeleton of claim 1, further comprising a load sensor disposed to sense a load indicative of tension in the ankle actuation cable.

22. The exoskeleton of claim 1, wherein the exoskeleton is a load bearing exoskeleton.

23. An exoskeleton, comprising:

a torso portion;

a leg assembly, comprising:

a lower leg assembly, comprising:

an ankle flexion/extension joint;

a footbed coupled to an ankle joint, the footbed having a rear portion behind the ankle joint;

an ankle actuation cable adapted to lift the rear portion of the footbed; and an upper leg assembly coupled to the lower leg assembly at a knee joint, the upper leg assembly comprising an ankle actuation motor to take in and release the ankle actuation cable, wherein taking in ankle actuation cable induces planter flexion of the footbed, the lower leg assembly comprising a remote parallelogram structure coupled to the ankle joint, the remote parallelogram structure allowing for yaw of the footbed and inversion/eversion of the footbed; and a hip joint assembly connecting the leg assembly to the torso portion, the hip joint assembly comprising a hip abduction/adduction to hip internal/external rotation to hip flexion/extension kinematic chain;

wherein the ankle joint comprises a first spherical joint and a second spherical joint and wherein the lower leg assembly further comprises a first parallel member running from the remote parallelogram structure to the first spherical joint and a second parallel member running from the remote parallelogram structure to the second spherical joint.

24. The exoskeleton of claim 23, wherein the hip joint assembly comprises:

the hip abduction/adduction joint defining a hip abduction/adduction axis;

a hip flexion/extension joint defining a hip flexion/extension axis;

a hip abduction/adduction actuator to drive abduction/adduction of the leg assembly about the hip abduction/adduction axis, the hip abduction/adduction actuator remote from the hip abduction/adduction axis; and a hip flexion/extension actuator to drive flexion and extension of the leg assembly about the hip flexion/extension axis, the hip flexion/extension actuator remote from the hip flexion/extension axis.

25. The exoskeleton of claim 24, wherein the hip joint assembly comprises:

a scissor linkage coupled to the leg assembly; and a hip abduction/adduction linkage coupled to the hip abduction/adduction joint, the scissor linkage and the hip abduction/adduction actuator, wherein the hip abduction/adduction actuator is adapted to drive the hip abduction/adduction linkage to induce abduction/adduction of the scissor linkage about the hip abduction/adduction axis to abduct/adduct the leg assembly.

26. The exoskeleton of claim 23, further comprising a biasing member coupled to the first parallel member and the footbed to bias the rear portion of the footbed down.

* * * * *